United States Patent
Zhou et al.

(10) Patent No.: US 10,210,535 B2
(45) Date of Patent: Feb. 19, 2019

(54) DYNAMICALLY GENERATING FEEDBACK BASED ON CONTEXTUAL INFORMATION

(71) Applicant: Microsoft Technology Licensing, LLC, Redmond, WA (US)

(72) Inventors: Yang Zhou, San Jose, CA (US); Lixin Feng, Sunnyvale, CA (US); Yu Cao, Sunnyvale, CA (US); Raviraj Jain, San Francisco, CA (US); Alexis Baird, San Francisco, CA (US); Xin Fu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 14/599,013

(22) Filed: Jan. 16, 2015

(65) Prior Publication Data
US 2016/0210645 A1 Jul. 21, 2016

(51) Int. Cl.
*G06Q 30/02* (2012.01)
*G06Q 50/00* (2012.01)

(52) U.S. Cl.
CPC ..... *G06Q 30/0203* (2013.01); *G06Q 30/0201* (2013.01); *G06Q 30/0269* (2013.01); *G06Q 50/01* (2013.01)

(58) Field of Classification Search
None
See application file for complete search history.

(56) References Cited

U.S. PATENT DOCUMENTS

| 2009/0307002 A1* | 12/2009 | Costanzo | G06Q 30/02 705/2 |
| 2010/0205541 A1* | 8/2010 | Rapaport | G06Q 30/02 715/753 |
| 2014/0150016 A1* | 5/2014 | Feng | G06O 30/0269 725/34 |

OTHER PUBLICATIONS

Giuseppe La Torre et al., A Context-Aware Solution to Improve Web Service Discovery and User-Service Interaction, 2016 Intl IEEE Conferences on Ubiquitous Intelligence & Computing, pp. 180-187.*

(Continued)

*Primary Examiner* — Christine M Behncke
*Assistant Examiner* — Matthew H Divelbiss
(74) *Attorney, Agent, or Firm* — Hickman Palermo Becker Bingham LLP; Daniel D. Ledesma

(57) ABSTRACT

Techniques for dynamically generating feedback based on contextual information and providing the feedback to a user are provided. A service provider determines, based on contextual information related to a user (such as personal information previously provided by the user) interactive data to display to the user. The type of interactive data may correspond to the type of personal information submitted by the user or derived by the service provider. The interactive data may be based on other users that have already registered with the service provider. In this way, a user is able to (1) view current and relevant information that is related to the user and (2) see the value that the user receives by providing additional personal information. Subsequent interactive data may be based on multiple personal data items that the (Continued)

service provider receives from the user. These techniques are also applicable after a user has registered with a service provider.

27 Claims, 21 Drawing Sheets

(56) References Cited

OTHER PUBLICATIONS

International Searching Authority, "Search Report" in application No. PCT/US2015/051149, dated Nov. 27, 2015, 11 pages. Claims in application No. PCT/US2015/051149, dated Nov. 2015, 4 pages.

\* cited by examiner

DYNAMICALLY GENERATING FEEDBACK BASED ON CONTEXTUAL INFORMATION

FIELD OF THE DISCLOSURE

The present disclosure relates to dynamically generating data-driven feedback for display to users to encourage higher user engagement.

BACKGROUND

It is crucial for some service providers to collect user input from online forms to obtain user personal information and understand their intent or interests in order to help users to establish online identity or to provide relevant services to users. However, prompting users to input information is a barrier to user engagement and oftentimes users drop off without completing the tasks of inputting personal information. In this disclosure contextual information is used to dynamically generate feedback that is pertinent to users' interest to increase users' engagement level and encourage them to complete input tasks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for dynamically generating interactive feedback based on contextual information, such as user input, a user profile or demographic information, or page content. The interactive feedback is pertinent to the user and, thus, the user may find it interesting and may be kept engaged in the content/flow/actions that we expect the user to complete. In one technique, a service provider provides a registration flow that is interactive, such that, as a user enters registration information, the service provider provides interactive data that is relevant to the user. The interactive data may be based on other users (e.g., registered members) or entities that use the service(s) of the service provider individually or aggregated. The interactive data may be generated periodically depending on how quickly out-of-date the interactive data may become.

In a related technique, a service provider dynamically generates feedback based on the input of a user's profile to indicate the value the user receives by providing additional profile information to the service provider.

In another technique, a service provider dynamically generates feedback based on data that a user is currently viewing. For example, if a user is viewing content related to finance, then the service provider provides information about jobs in the finance industry.

While embodiments herein are described in the context of a social network service, embodiments are also applicable to other items for which a user might provide personal information, such as a product, a prize, a contest, or a reward or loyalty program.

System Overview

Figure 1:
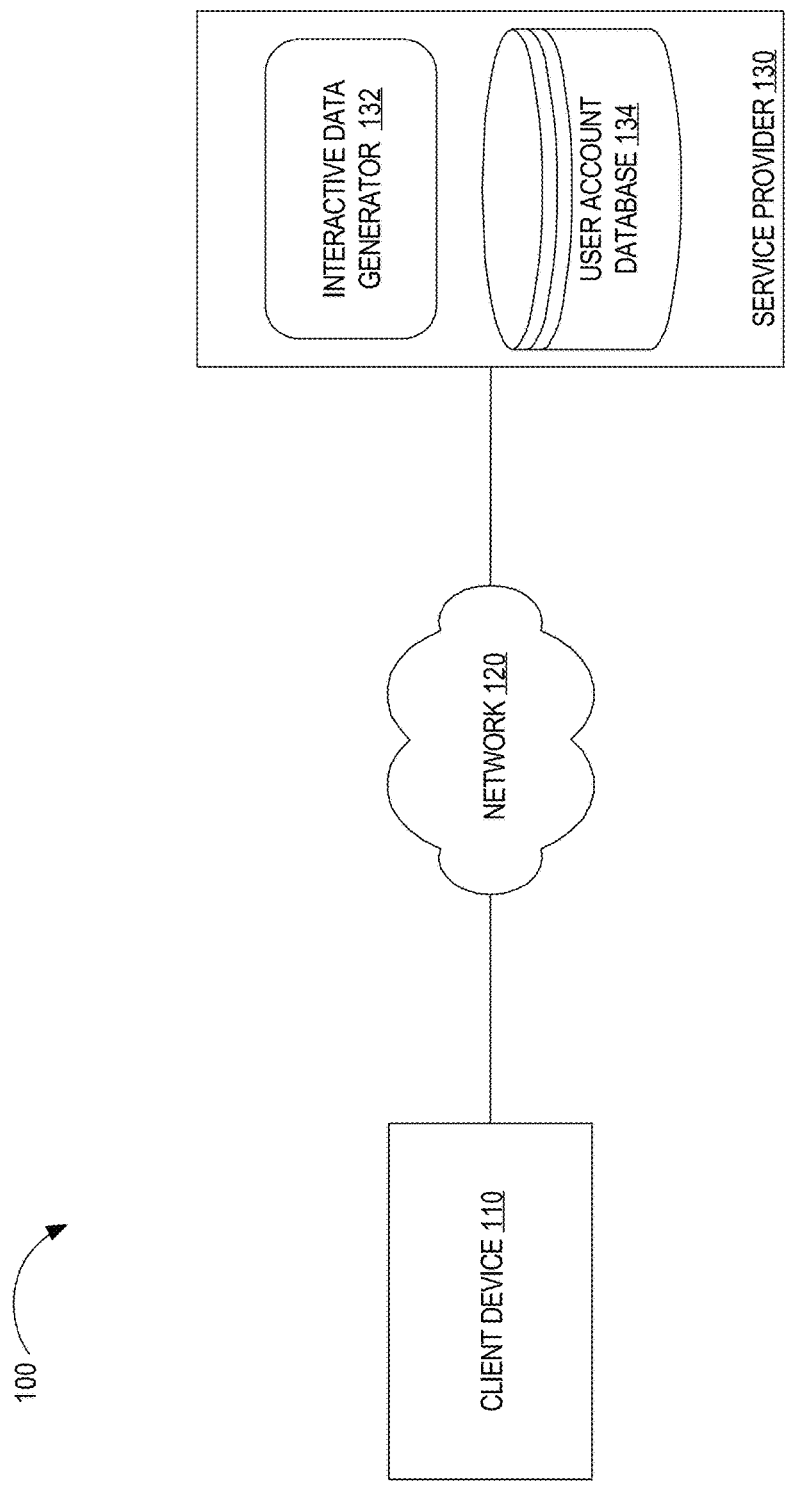
FIG. 1 is a block diagram that depicts an example system architecture for obtaining personal information from multiple users, in an embodiment.

FIG. 1 is a block diagram that depicts an example system architecture 100 for determining contextual information associated with multiple users, in an embodiment. System architecture 100 includes a client device 110, a network 120, and a service provider 130.

Client device 110 is a computing device that is capable of communicating with service provider 130. Examples of computing devices include a desktop computer, a laptop computer, a tablet computer, and a smartphone. Although only a single client device 110 is depicted in FIG. 1, system architecture 100 may include numerous client devices, each of which may provide personal user information to service provider 130.

Client device 110 may execute a browser application that is configured to accept input (such as uniform resource locator (URLs)), transmit HTTP requests to multiple remote servers, receive HTTP responses, render web pages based on the HTTP responses, and display the rendered web pages on a screen of client device 110. Additionally or alternatively, client device 110 may execute an application (such as a smartphone "app") that is configured to communicate with one or more remote servers (e.g., provided by service provider 130) to upload data and obtain requested content.

Communication between client device 110 and service provider 130 is made over network 120. Network 120 may be implemented by any medium or mechanism that provides for the exchange of data between various entities communicatively coupled to network 120. Examples of network 120 include, without limitation, a network such as a Local Area Network (LAN), Wide Area Network (WAN), Ethernet or the Internet, or one or more terrestrial, satellite, or wireless links. Network 120 may include a combination of networks such as those described. Network 120 may transmit data according to Transmission Control Protocol (TCP), User Datagram Protocol (UDP), and/or Internet Protocol (IP).

Service provider 130 may provide any type of service or product. Examples of service providers include social network providers, such as Facebook, Google Plus, Twitter, Hi5, and LinkedIn. Service provider 130 includes one or more computing devices and one or more storage devices that store data (for example, in user account database 134) regarding one or more users that are registered with the service provider. If service provider 130 is a social network provider, then the data in user account database 134 may be modeled as a graph where nodes, that represent users or content items, are connected to one or more. Users may be individuals or organizations, such as business entities.

Although FIG. 1 depicts service provider 130 as comprising a single entity, service provider 130 may be a geographically distributed service comprising multiple POP centers and multiple data centers that may communicate with each other and offer redundant internal services in case of failure of any one service or data center.

Service provider 130 includes an interactive data generator (IDG) 132 that is implemented in hardware, software, or any combination of hardware and software. IDG 132 determines interactive data for display to a user (e.g., operating client device 110) in order to indicate the value that the user receives by providing personal information. IDG 132 determines interactive data based on one or more pieces of contextual information. The interactive data is preferably relevant to the user. Otherwise, it is less likely that the user will provide additional information to service provider 130 or use the service(s) provided by service provider 130.

IDG 132 may be communicatively coupled to another component of service provider 130 that receives or processes requests from client device 110. For example, if client device 110 executes a dedicated application, the application may transmit a personal data item (input by the user) over network 120 to a data processor on service provider 130. The data processor sends the personal data item to IDG 132, which uses the personal data item to identify interactive data that is related to the personal data item. IDG 132 sends the interactive data to the data processor, which then transmits the interactive data to the application for display on client device 110.

Additionally or alternatively, IDG 132 may receive a client request that is directed to IDG 132. For example, a web server on service provider 130 sends web content (e.g., HTML, JavaScript, and CSS) to a web browser of client device 110, which browser displays a form for accepting personal information. JavaScript executing within the web browser accepts a personal data item that a user enters as input into a data field of the form and transmits the personal data item directly to IDG 132, which determines what to display based on the personal data item and returns the determined information to the web browser for display.

Interactive Data

"Interactive data" is feedback that is related to and determined based on contextual information (a) that service provider 130 deduces about a user or (b) that the user explicitly provided to service provider 130. Examples of contextual information include user input, user profile data (e.g., geo location, age, gender), and content (e.g., a web page) that is currently displayed, played, or otherwise presented to a user.

Interactive data may be generated not only on one piece of contextual information, but on a combination of multiple sources of contextual information. For example, IDG 132 may analyze (1) data from the user's profile and (2) a web page that the user is currently viewing in order to generate interactive data for displayed to the user. As a specific example, IDG 132 may determine that (1) a user is viewing a blog that is about recent court decisions and (2) an online profile of the user indicates that the user lives in Raleigh, N.C. Based on those two pieces of contextual information, IDG 132 causes a number of law-related job postings in the Raleigh area to be displayed to the user.

The type of interactive data may be the same as the content type of the contextual information upon which the interactive data is based. For example, if contextual information is geographic information, then the interactive data (that is displayed in response to receiving or otherwise determining the geographic information) is related to geography. Interactive data may be text, audio, video, or graphics.

If interactive data is related to the contextual information for a particular user, then the interactive data is more likely to be relevant to the particular user. As noted above, a database (e.g., user account database 134) may be queried (e.g., IDG 132) for data that corresponds to the type of contextual information. For example, if a user is from a particular country, then the database may be queried for data about the particular country or, more specifically, for data about job openings in that particular country or for data about other users that reside in the particular country. Also, if it is determined that the user is a chemist, then the query of the database may be limited to job openings (in the particular country) that are related to chemistry.

Alternatively to query a database based on one or more pieces of contextual information, a machine learning algorithm may be used to train a model for better relevancy based on user feedback. For example, based on a given set of contextual information related to a user, a model determines to display interactive data of a particular type to the user. If the user does not provide any more information or otherwise disengages from the current interactive process, then the model may be trained based on this negative result such that the model is less likely to display interactive data of the particular type to the user, to users that are deemed similar to the user, or to any user. On the other hand, if the user does provide additional feedback after receiving (e.g., viewing) the interactive data, then the model may be trained based on this positive result such that the model is more likely to display interactive data of the particular type to the user, to similar users, or to all users.

A single model may be generated for all users of service provider 130. Alternatively, multiple models may be generated, one for each different class of users. A class of users may be defined based on any combination of one or more attributes of users of service provider 130, such as geo location, gender, age, employment status, industry, job title, academic degree, etc. Thus, one model may be generated and trained for a first class of users (e.g., users from English-speaking countries without an advanced degree) and another model may be generated and trained for a second class of users (e.g., executives from Spanish-speaking countries).

In addition to being generated based on contextual information, interactive data is also generated based on a system that stores aggregated data and a system that stores identity information. For example, if contextual information is the user profile of a particular user, then (1) aggregated data may be thousands or millions of user profiles of different users and (2) identity information may be job postings or influencer information.

Interactive data may be generated from other data items that do not include the personal information. The other data items may be from other users of service provider 130. Information about such other users may be stored in user account database 134. For example, interactive data based on a user's location may include information about registered members of service provider 130 who reside within the user's location.

"Other users" may be individual people, organizations, and/or any other groupings of entities. A group may be a group of people and/or organizations. A group may be formally established outside of (or separate from) the service provider 130 or artificially created by the service provider 130. For example, a group may be all registered users of service provider 130 who have graduated from a particular school or who have received chemotherapy treatment. As another example, a group may be the American Medical Association (AMA) or all non-profit organizations that have provided health care to prison inmates.

In an embodiment, IDG 132 stores an association between types of personal information and types of interactive data. For example, educational institution may be associated with (1) an alumni count that indicates a number of alumni of the education institution who are also members of service provider 130; (2) a job seeking count that indicates a number of alumni that are seeking job opportunities; and (3) and a notable count that indicates a number of alumni that service provider 130 has designated as notable, which designation may be based on one or more objective criteria. As another example, industry may be associated with (1) a company count that indicates a number of companies in the named industry; (2) an influencers count that indicates a number of members of service provider 130 who are also designated by service provider 130 as an "influencer" in the named industry; and (3) job count that indicates a number of job openings in the named industry (and which may be posted on a website of service provider 130).

Another personal information type is company and associated interactive data types may include employee count that indicates a number of employees of the named company, job count that indicates a number of current job openings at the named company, follower count that indicates a total number of followers who are members of the service provider, and an update count that indicates one or more values that members receive on average from updating certain profile information (e.g., lift in profile views and lift in recruiter contacts).

In an embodiment, if a personal information type is associated with multiple interactive data types, then IDG 132 may use one or more criteria to determine which interactive data type to select for display on client device 110. The one or more criteria may be based on the specific values of each interactive data type given the specific personal information in a particular user scenario. Alternatively, the one or more criteria may be based on an overall effectiveness determined for each interactive data type.

Time Sensitive Data Types

Different types of interactive data that service provider 130 determines for display may vary in time sensitivity. For example, a total number of registered members of service provider 130 may not vary (e.g., increase) significantly over time while a total number of job openings in a particular country, location, or employer may vary greatly. Therefore, service provider 130 may analyze user account database 134 (and/or other local or remote data sources) to update some interactive data items frequently and other interactive data items infrequently.

The decision on how often to update one or more interactive data items may be based on a time sensitivity factor associated with the corresponding type. The time sensitivity factor of an interactive data type may be established by user input or may be determined automatically by tracking one or more interactive data items of the same type over time and, if one or more data items of a particular type varies a certain amount over a certain period of time, then the time sensitivity factor is adjusted accordingly. For example, if an interactive data item changes more than 50% in a week's time, then the time sensitivity factor of the interactive data type is increased so that all (or at least some) data items of the interactive data type are tracked on a more frequent basis, such as every three days.

Tracking User Feedback

In an embodiment, service provider 130 keeps track of what type of interactive data is provided to users and whether and/or how much additional personal data items users provide to service provider 130 thereafter. For example, for users who receive total membership information regarding their respective country of residence (e.g., "50+ million users in your country"), only 56% provide additional personal information to service provider 130. In contrast, for users who receive total job openings in their respective country of residence (e.g., "50,000 job openings in your country"), 83% provide additional personal information to service provider 130.

The tracked data may be on a total user basis, on a per-country basis, on a per-city basis, on a per-job title basis, or on another basis that is related to a type of personal information, such as educational institution attended, cancer survivor status, or history of being prescribed medical marijuana. For example, three different types of interactive data are provided to users from France who provide their country of residence and a job title: one third of such users are provided a first type of interactive data, another third of such users are provided a second type of interactive data, and yet another third of such users are provided a third type of interactive data. Service provider 130 determines, for each group of users, a percentage of that group that provided additional personal information to service provider 130.

Under an A/B test approach for determining best treatment, service provider 130 may adjust, based on the tracked data, which types of interactive data that are provided to users or certain users who satisfy certain criteria, such as users from Europe who are currently unemployed. For example, if service provider 130 determines, based on tracked data for a particular set of users who satisfy certain criteria, that a first type of interactive data results in a higher percentage of users providing additional personal information relative to users who were presented with a second type of interactive data, then service provider 130 may send only the first type of interactive data to users who satisfy the certain criteria in order to ensure that more users complete registration or at least provide more personal information to service provider 130.

Under a machine-learning approach, a machine learning model is trained in either an offline or online stage based on previous users' contextual feedbacks and users' responses, and the optimal treatment is determined for each user and each contextual information combination in an online stage using that model.

Example Registration Process

Users are increasingly accustomed to filling out forms with personal information to sign up (or register) for a service, a product, a prize, a contest, etc. Personal information may include first and last name, place of residence, phone number, email address, occupation, and/or interests of a particular individual. However, some people are reluctant to provide certain personal information, especially if they find little benefit in doing so. Consequently, many people begin filling out a form but do not complete the form. As a result, the full potential of the service, product, prize, or contest is not realized.

Figure 2:
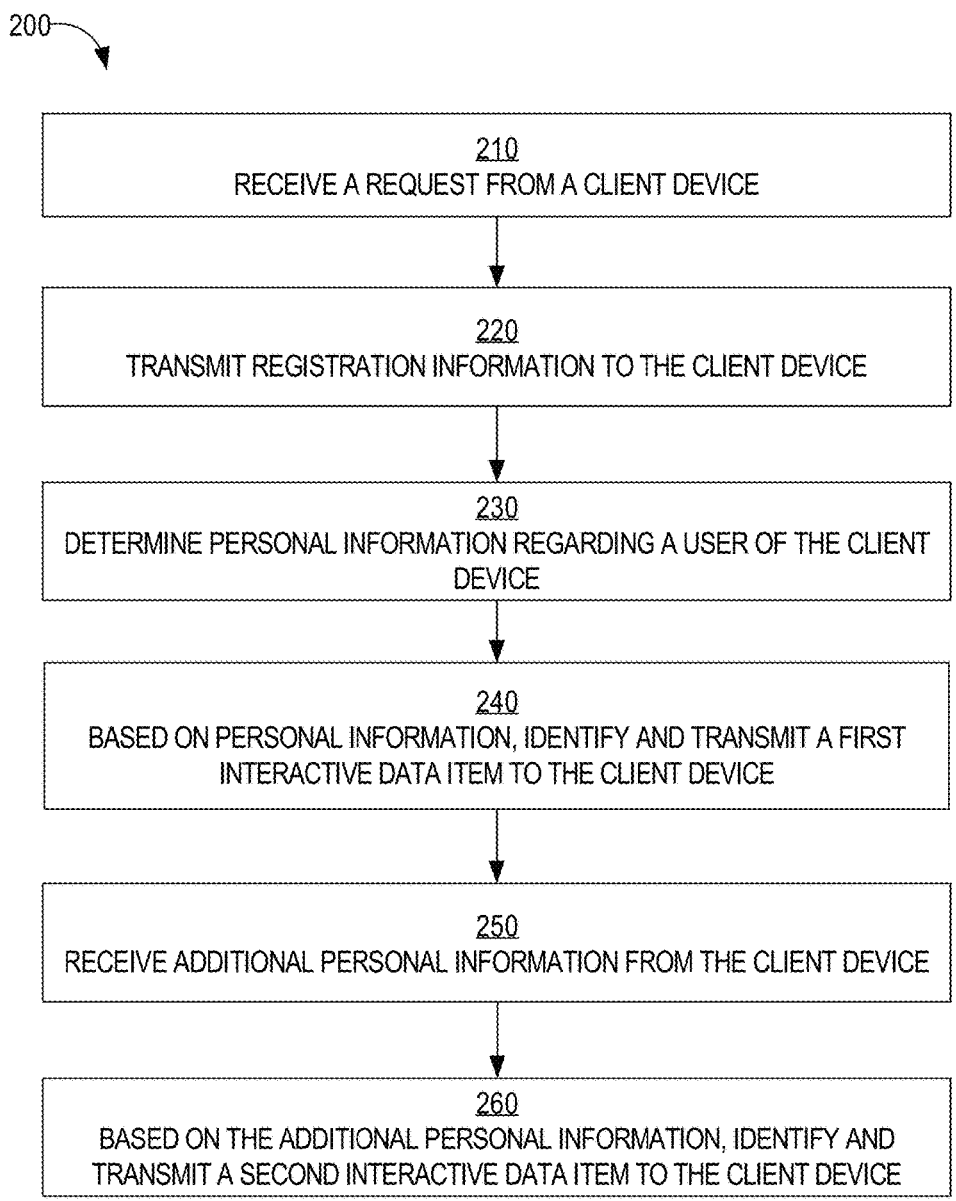
FIG. 2 is a flow diagram that depicts a process for providing relevant information to a user in response to receiving personal information from the user, in an embodiment.

FIG. 2 is a flow diagram that depicts a process 200 for providing relevant information to a user in response to receiving personal information from the user, in an embodiment. Process 200 is implemented by one or more components of service provider 130, such as interactive data generator 132.

At block 210, a client request for a service is received. For example, the client request may be a request to register with service provider 130 in order to leverage the service(s) provided by service provider 130.

At block 220, registration information is transmitted to client device 110. The registration information may include form data that, when displayed on a screen of client device 110, include one or more data fields in which the user is invited to provide personal information, such as name, place of residence, employment status, name of current employer, job title, seniority level, name of alma mater, an interest (e.g., a particular sports team, a particular type of art, a particular music band), names of ancestors of the person, and medical history (such as past surgeries or ailments suffered).

At block 230, personal information regarding a person is determined. In one embodiment, the personal information is information that a user explicitly provides (e.g., in the form of text or voice data) to client device 110. For example, a user of client device 110 enters, into a digital text field that is labeled "City of Residence", a city name (e.g., through a physical or graphical keyboard).

In another embodiment, the personal information may be derived by service provider 130 based on information that the user did not explicitly provide to service provider 130. For example, the information that service provider 130 receives may be an autonomous system number (ASN), a MAC address, or an IP address associated with client device 110. Such data may be indicated in a request that client device 110 submits to service provider 130. Based on such information, service provider 130 may derive a geographical location of client device 110. As another example, an application executing on client device 110 that sends data and requests to service provider 130 may be configured to send global positioning system (GPS) coordinates to service provider 130.

In a related embodiment, personal information of a user may be derived by service provider 130 based on context data. For example, service provider 130 may have access to one or more web content items that the user has requested (or has been displayed to the user) previously or that the user is currently viewing. For example, service provider 130 determines, based on web viewing history of the user, that the user is likely to be a male between twenty and thirty years old. Based on this derived information, service provider 130 determines what information to display to the user to indicate the value the user receives by providing personal information.

Block 230 (and other blocks of process 200) may be performed by interactive data generator (IDG) 132. IDG 132 may be the target of the personal information that client device 110 submits to service provider 130 or may receive the personal information from another component of service provider 130.

At block 240, based on the personal information determined by service provider 130, interactive data is retrieved and transmitted to client device 110. For example, if the personal information is that the user is currently unemployed, then the interactive data may be information about a number of job openings that the user can review. The number of job openings may be initially determined by service provider 130 or by job posting service that is separate from service provider 130.

At block 250, additional personal information regarding the user is determined or received from client device 110. For example, after the user provides a job status of "unemployed" (at block 230) and is displayed a total number of job openings (at block 240), the user provides a job title or category for which the user is seeking employment (at block 250).

At block 260, based on the personal information determined by service provider 130 (in block 250), second interactive data is identified and transmitted to client device 110.

Interactive data that is provided to a user may be based on a single personal data item, such as country of residence, gender, age, medical condition, or job status. Subsequent interactive data items that service provider 130 provides to the user may be based on multiple personal data items that have been determined for the user, either based on deduction (e.g., to determine geography), context (e.g., what the user is currently viewing), or explicit user input. For example, if the user first enters Sydney as her city of residence, then service provider 130 provides a first interactive data item that indicates that there are 1,289 job openings in Sydney. Then, the user enters "Software Engineer" as her job title. In response, service provider 130 provides a second interactive data item that indicates three companies in Sydney with job openings that have "Software Engineer" as the job title. Thus, the second interactive data item is based on both the residence information that the user entered initially and the job title.

Profile Edit

In the registration context, a user may have provided a minimal amount of personal information in order to register for a service provided by service provider 130. However, once the user has registered, service provider 130 may seek additional personal information from the user. The additional personal information may be leveraged by service provider 130 to better serve the interests of the user. For example, if service provider 130 is a professional networking service, then work history information about a particular user may help service provider 130 recommend relevant jobs to the particular user based on the particular user's work history. However, if the work history information is absent, then other users of the service may not consider the particular user as a candidate. As another example, if service provider 130 is a health service, then a complete medical history of a particular user may help service provider 130 better serve the particular user by, for example, informing the particular user of products or health practices that could mitigate certain health risks to which the particular user may be prone.

Thus, in an embodiment, service provider 130 sends interactive data to client device 110 when a user of client device 110 is expected to input identity information in a professional social network. The interactive data is determined based on the responses of previous users' input and contextual feedbacks. The interactive data may be displayed to a user in response to the user editing his/her profile information.

For example, while a user edits his/her profile data, service provider 130 sends interactive data to the user's client device. As a specific example, in response to the user changing or inputting his/her job history or job title, the interactive data may be the following: "Providing this information may cause your profile to be viewed 43% more."

Non-Registration Context

While process 200 is described in the context of a registration flow to encourage the user to provide additional personal information about the user when the user is registering with service provider 130, process 200 may be performed in a non-registration context. For example, a kiosk in a market or a grocery store may prompt a user to enter personal medical information. Based on personal information that the user has entered so far, the kiosk displays information that is related to the personal information and that may pique the user's interest. As a result, the user is more likely to respond to additional requests from the kiosk for the user's personal information. With a fuller medical history of the user, the kiosk may offer products or services that are targeted to the user's needs.

Screenshots of a Registration Example

FIGS. 3A-3E are screenshots of an example registration flow, in an embodiment. The registration flow is provided and maintained by service provider 130 and the screenshots are of user interfaces displayed on client device 110.

Figure 3A:
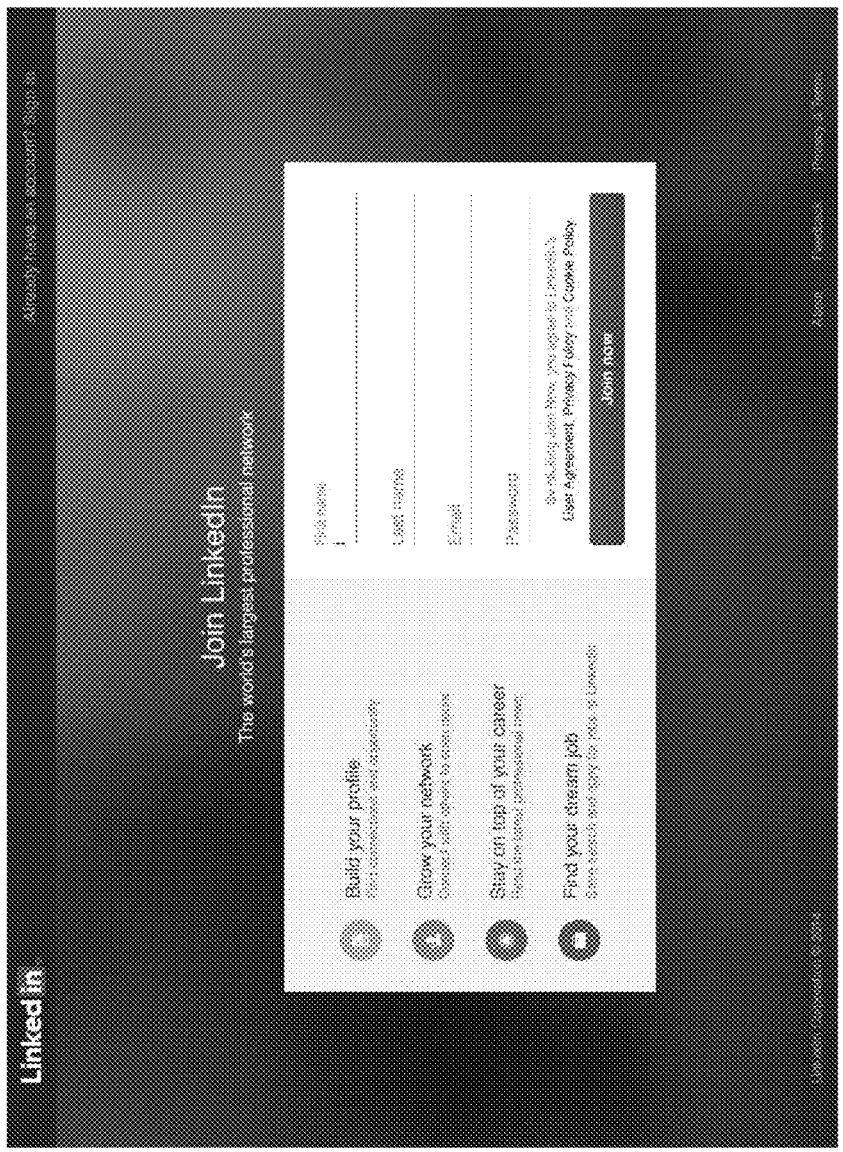
FIGS. 3A-3E are screenshots of an example registration flow, in an embodiment.

FIG. 3A depicts user interface 310 that includes four text fields: one for first name, one for last name, one for email address, and one for a password that the user will provide when the user desires to utilize the service provided by service provider 130 in the future.

Figure 3B:
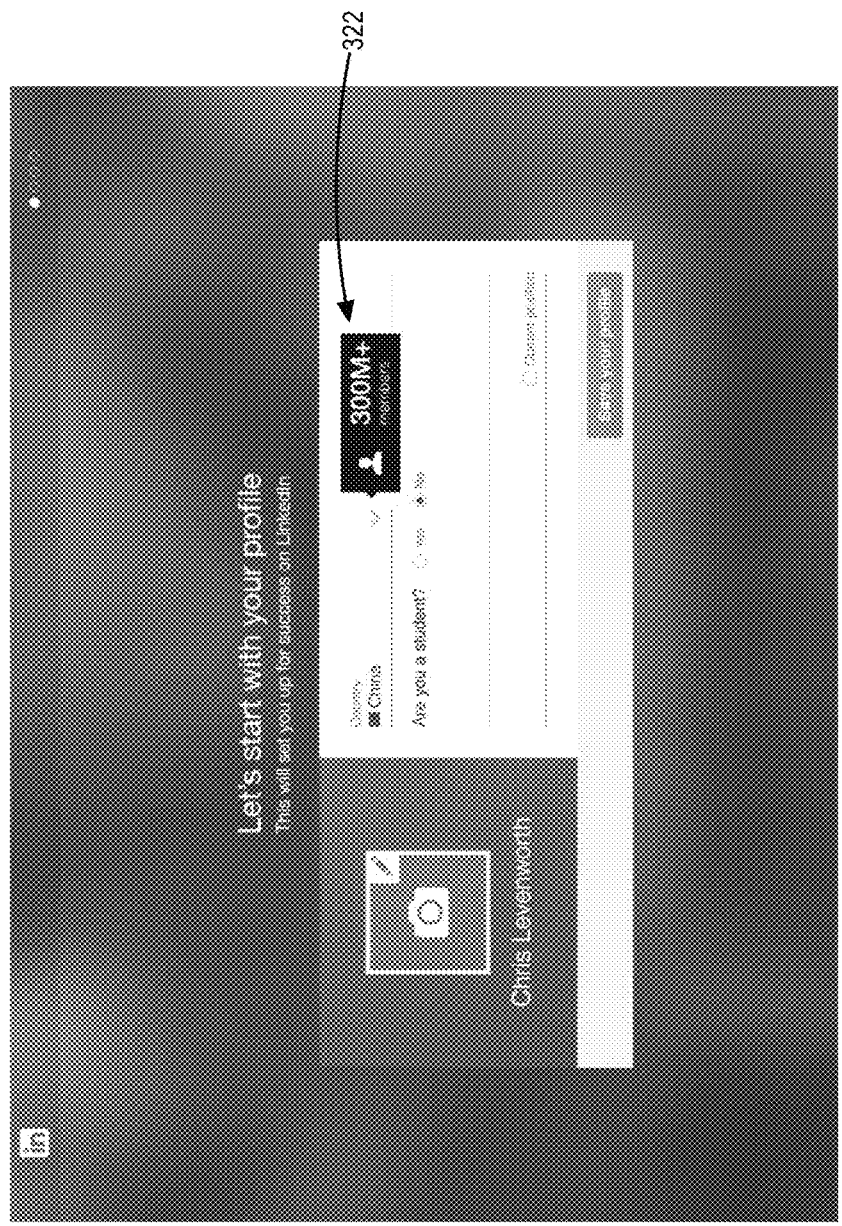

FIG. 3B depicts user interface 320 that is displayed after the user has submitted the information in user interface 310 to service provider 130. Specifically, user interface 320 is displayed to the user after the user has entered "China" as the user's country of residence. User interface 320 includes member data 322 that indicates a number of members, of service provider 130, that reside in China. In this example, the number is greater than 300 million. This information may prompt the user to enter more personal information.

Figure 3C:
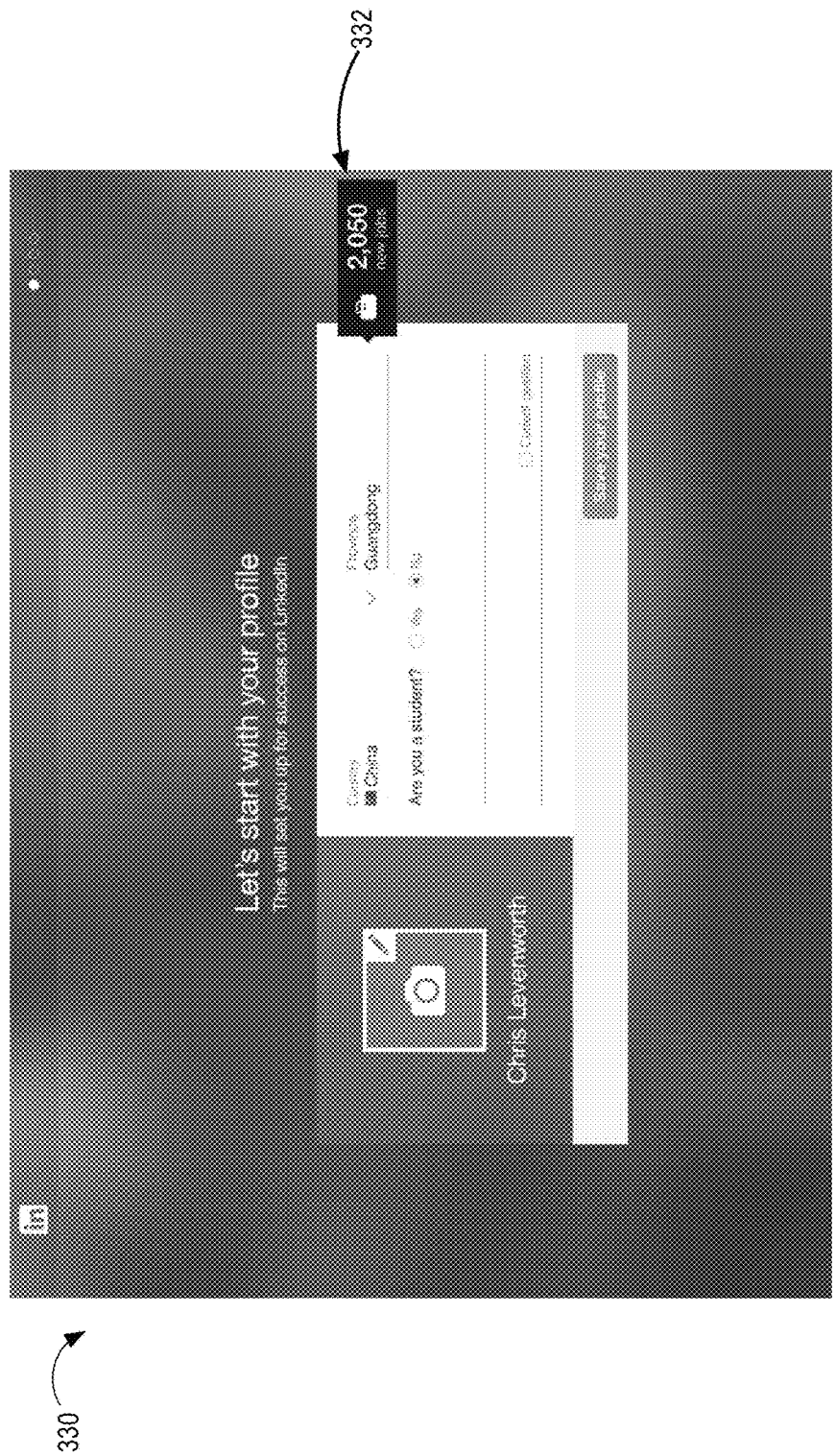

FIG. 3C depicts user interface 330 that is displayed after the user has entered "Guangdong" as the user's province of residence. User interface 330 includes new job opening data 332 that indicates there are 2,050 "new" jobs in Guangdong, China. "New" jobs may refer to a certain number of job postings that have been uploaded to service provider 130 (and/or a separately maintained job board) within a particular period of time, such as the last week.

Figure 3D:
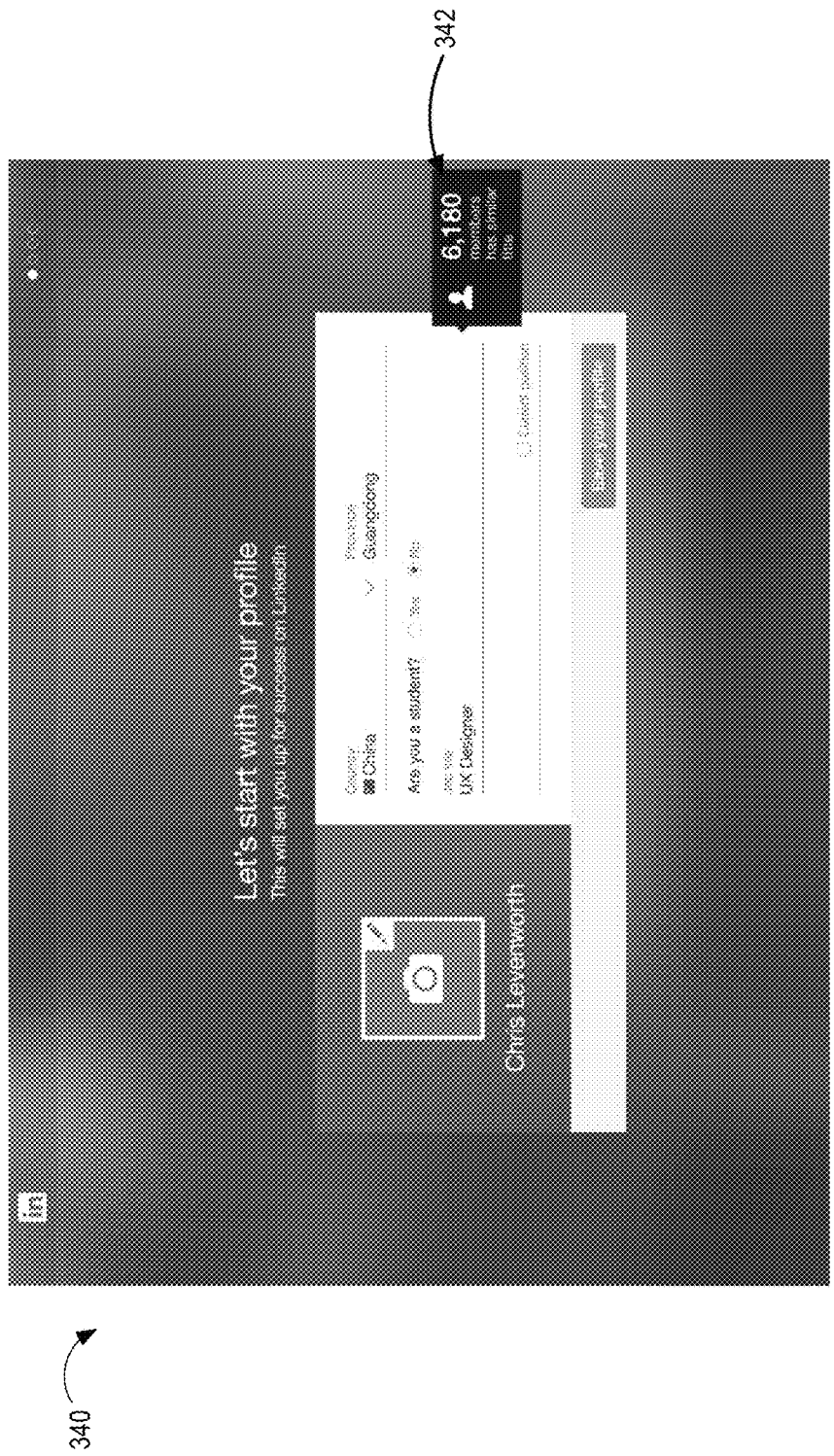

FIG. 3D depicts user interface 340 that is displayed after the user has entered "UX Designer" as the title of a job that the user is seeking. In response, IDG 132 provides job title information 342 that indicates that there are 6,180 members of service provider 130 who have the same or similar job title. In this example, the number of members who have the same or similar job title may be limited to members in Guangdong, members in China, or all members of service provider 130.

Figure 3E:
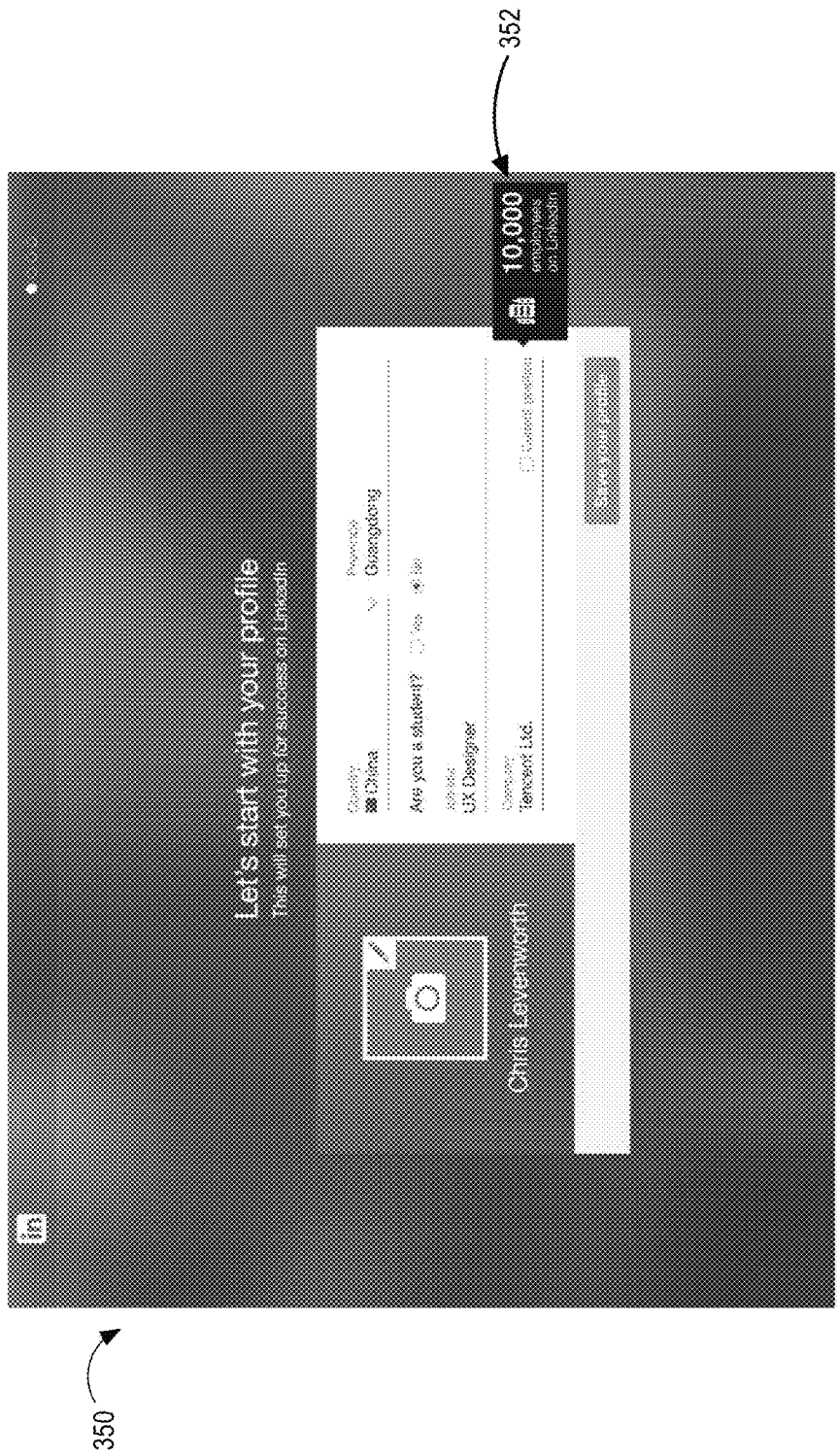

FIG. 3E depicts user interface 350 that is displayed after the user has entered "Tencent Ltd.", which is the name of the user's current employer. In response, IDG 132 provides employee data 352 that indicates that there are ten thousand employees of the named employer who are also members of service provider 130.

FIGS. 4A-4D are screenshots of another example registration flow, in an embodiment. The screenshots of FIGS. 3A-3E show interactive data in "tip bubbles" while the screenshots of FIGS. 4A-4D show interactive data above the registration information.

Figure 4A:
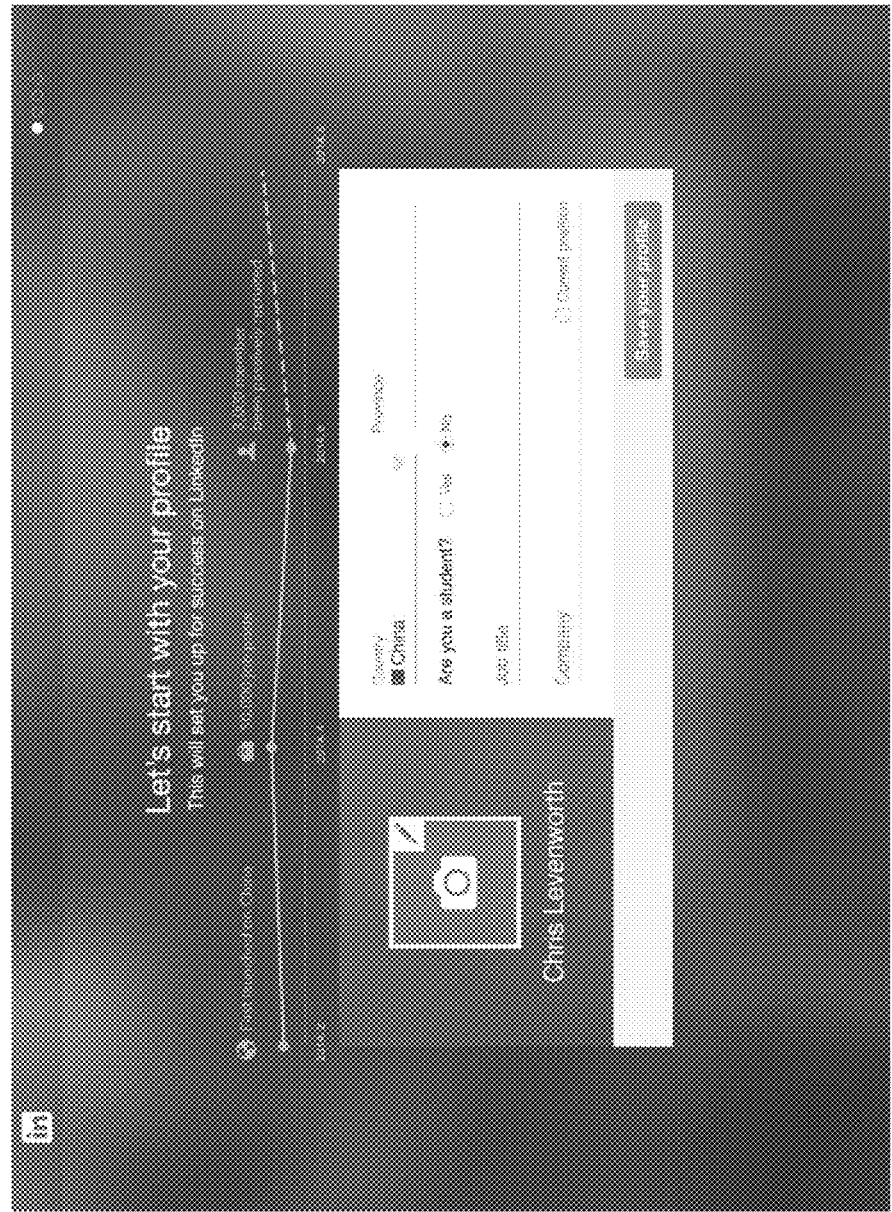
FIGS. 4A-4D are screenshots of another example registration flow, in an embodiment.

FIG. 4A depicts user interface 410 that may be displayed after a user interface similar to user interface 310 is displayed and after a user enters "China" as the country of residence. In addition to showing interactive data that indicates a number of job posts (i.e., 50,000) on a website of service provider 130 at a particular time in the past, user interface 410 indicates when a website of service provider 130 was first launched in China and a number of members of service provider 130 that have been passively recruited (i.e., 3,000).

Figure 4B:
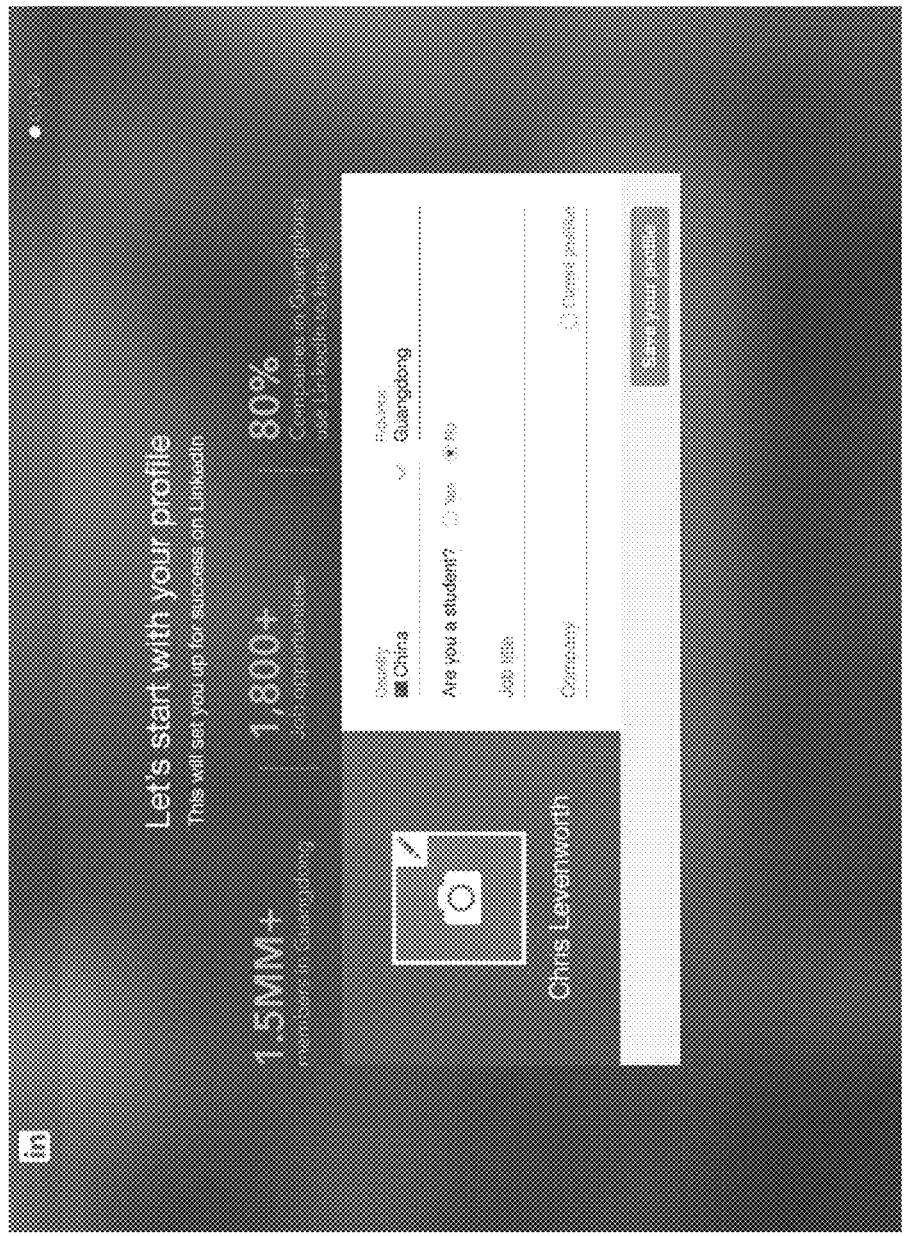

FIG. 4B depicts user interface 420 that is displayed after the user has entered "Guangdong" as the user's province of residence. User interface 420 indicates three items of interactive data: a number of members of service provider 130 who live in that province (i.e., over 1.5 million), a number of job opportunities in that province (i.e., over 1,800), and a percentage of companies in that province who use service provider 130 to hire (i.e., 80%).

Figure 4C:
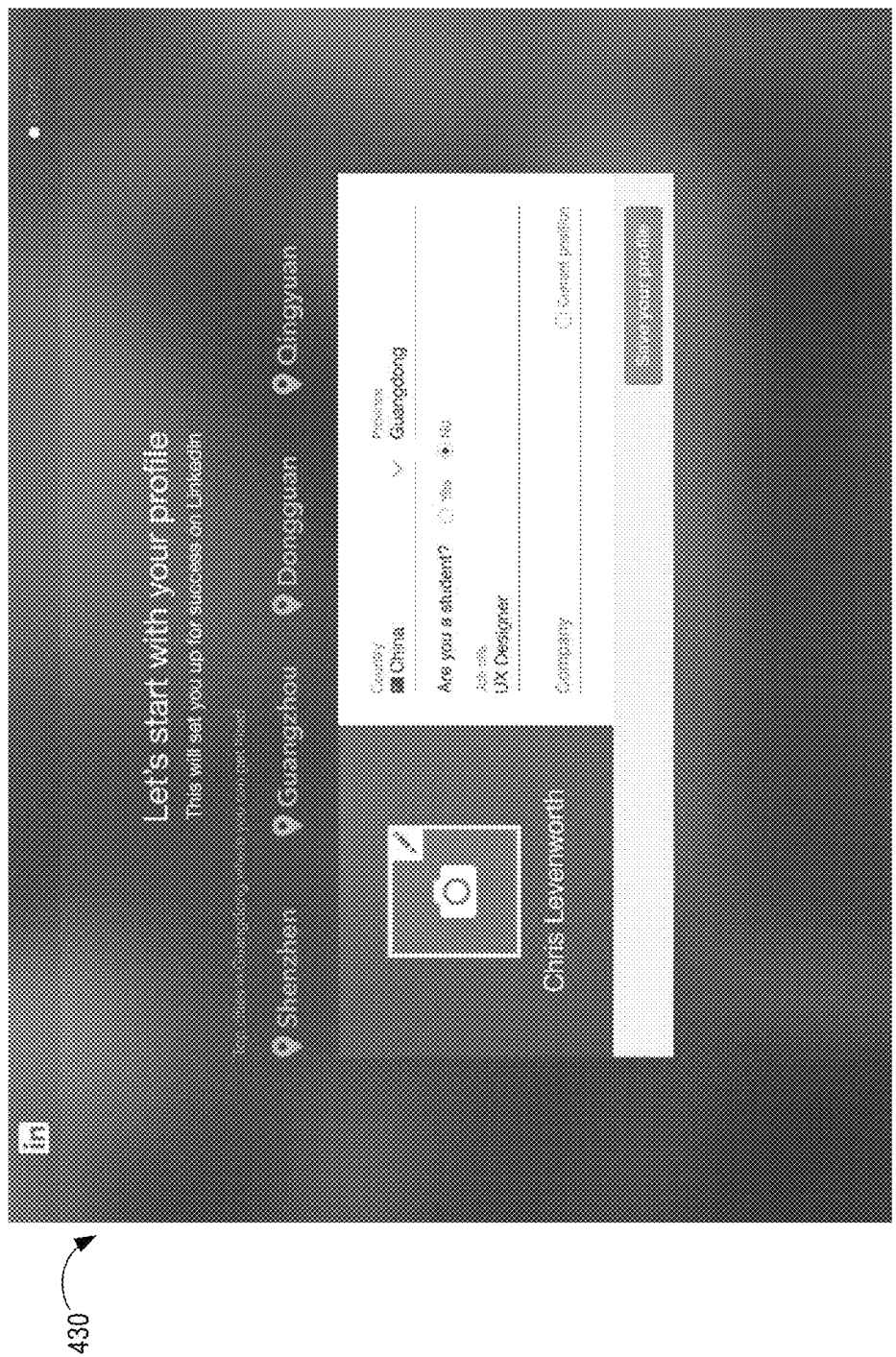

FIG. 4C depicts user interface 430 that is displayed after the user has entered "UX Designer" as a job title. User interface 430 specifies four cities (in the indicated province) that are hiring for the indicated job title. In this example, IDG 132 determines multiple instances of interactive data based on multiple instances of personal information (i.e., province of residence and job title).

Figure 4D:
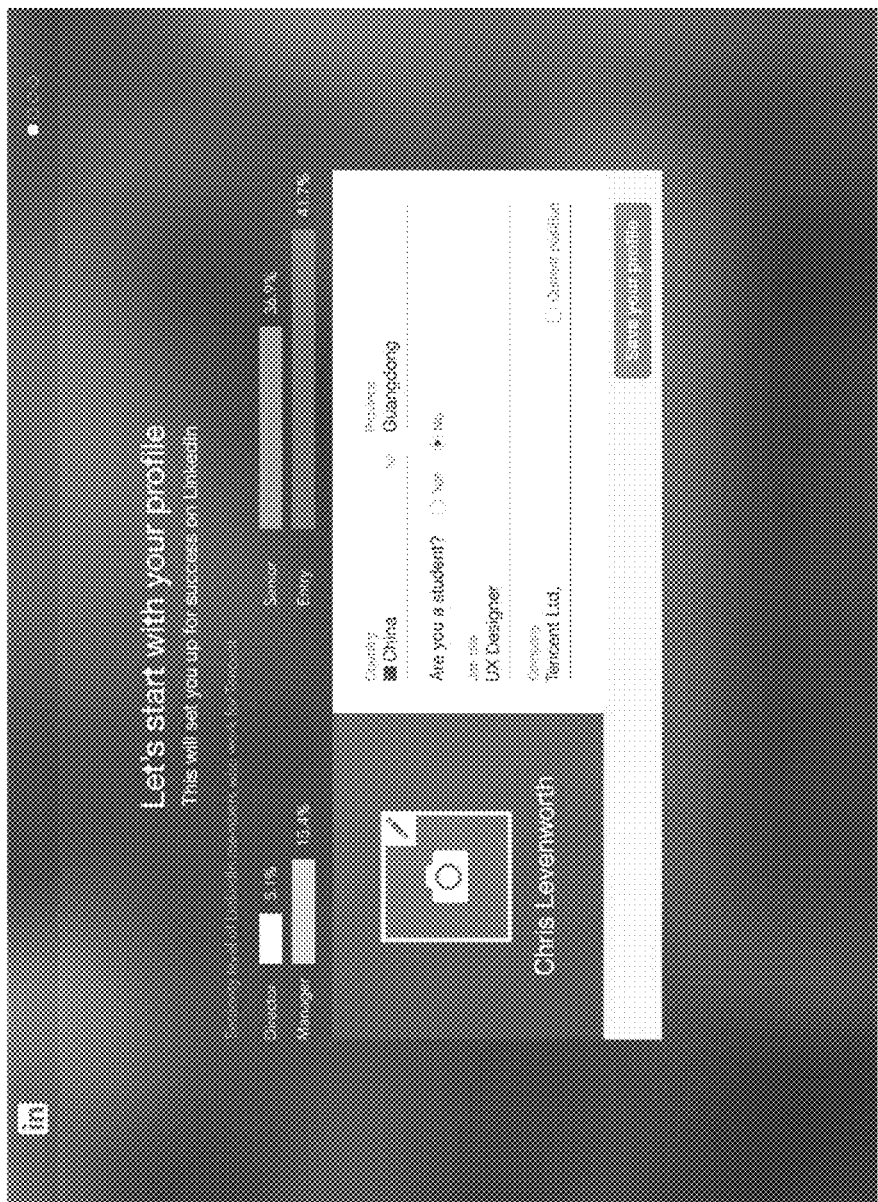

FIG. 4D depicts user interface 440 that is displayed after the user has entered "Tencent Ltd." as the name of the user's current employer. User interface 440 indicates the percentage, among all members of service provider 130 who work at the indicated company, of employees who have different seniority levels within the company. In this example, 5.1% of members of service provider 130 who are employed by the company are considered "Directors," while 15.4% of members of service provider 130 who are employed by the company are considered "Managers."

FIGS. 5A-5I are screenshots of another example registration flow, in an embodiment. The screenshots of FIGS. 5A-5I show interactive data in between input fields for entering personal information.

Figure 5A:
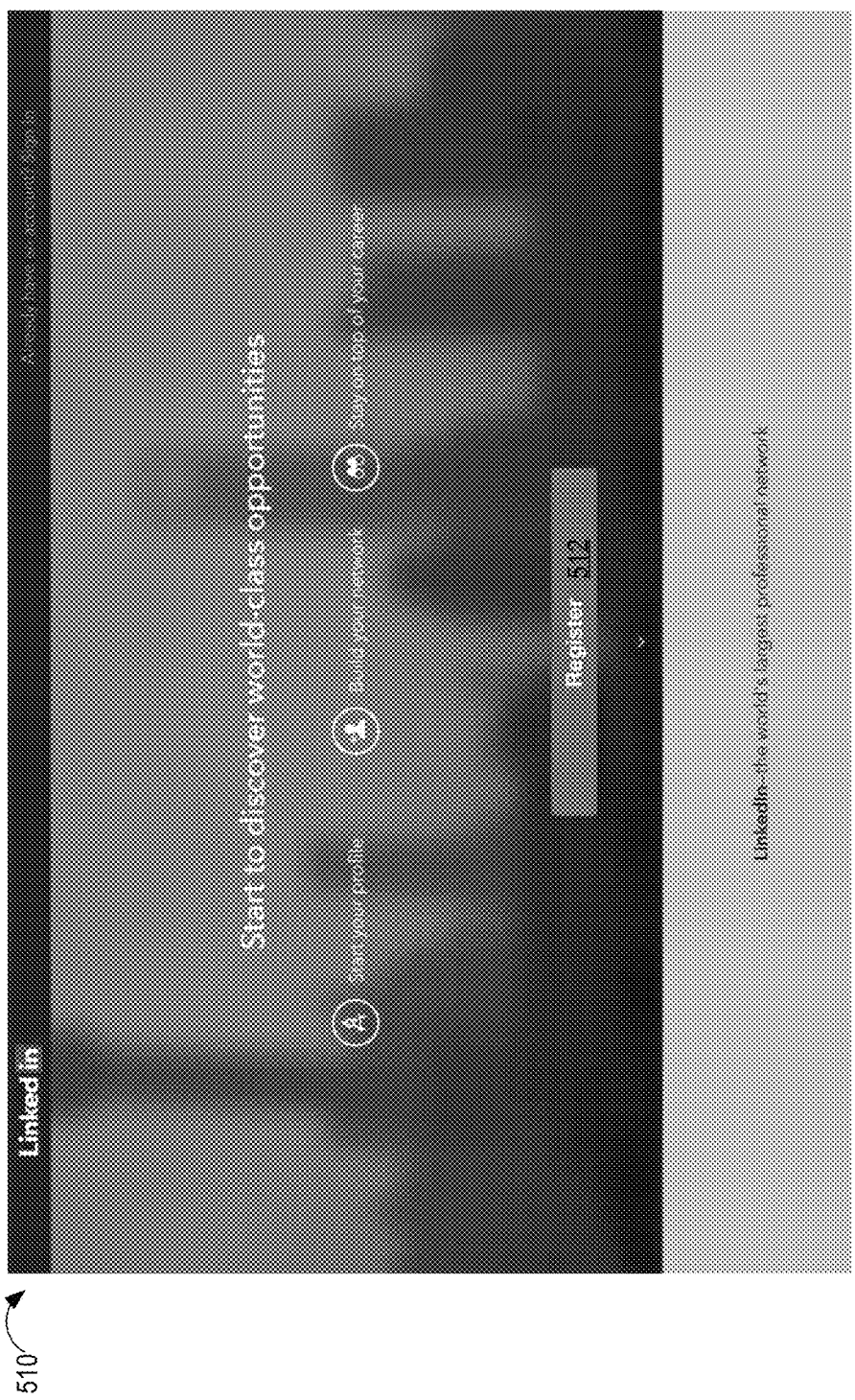
FIGS. 5A-5I are screenshots of another example registration flow, in an embodiment.
Figure 5B:
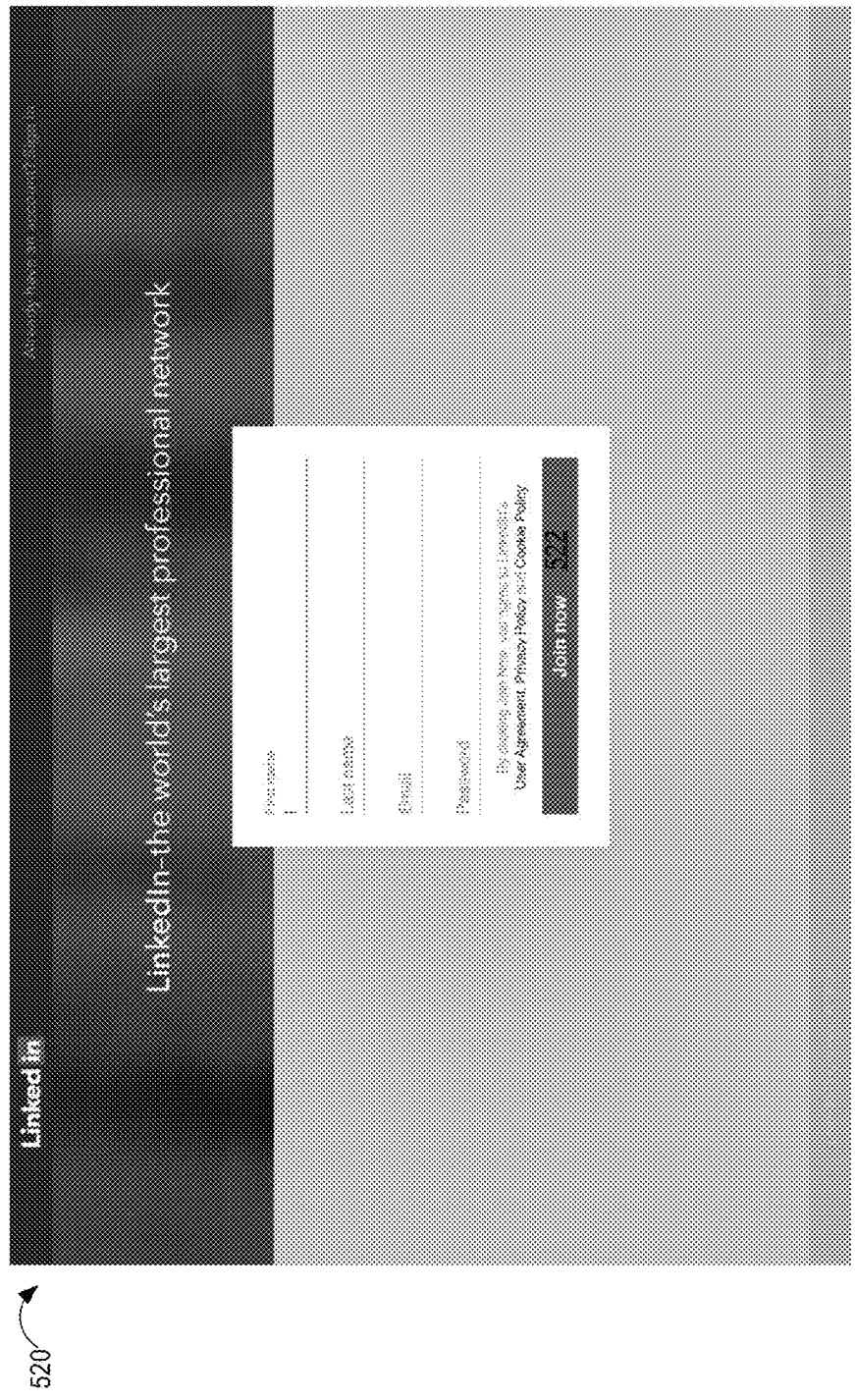

FIG. 5A depicts user interface 510 reflects a home page of service provider 130 for users who have not yet registered with service provider 130. User interface 510 includes a registration button 512 that, when selected by a user, causes user interface 520 of FIG. 5B to be displayed.

Figure 5C:
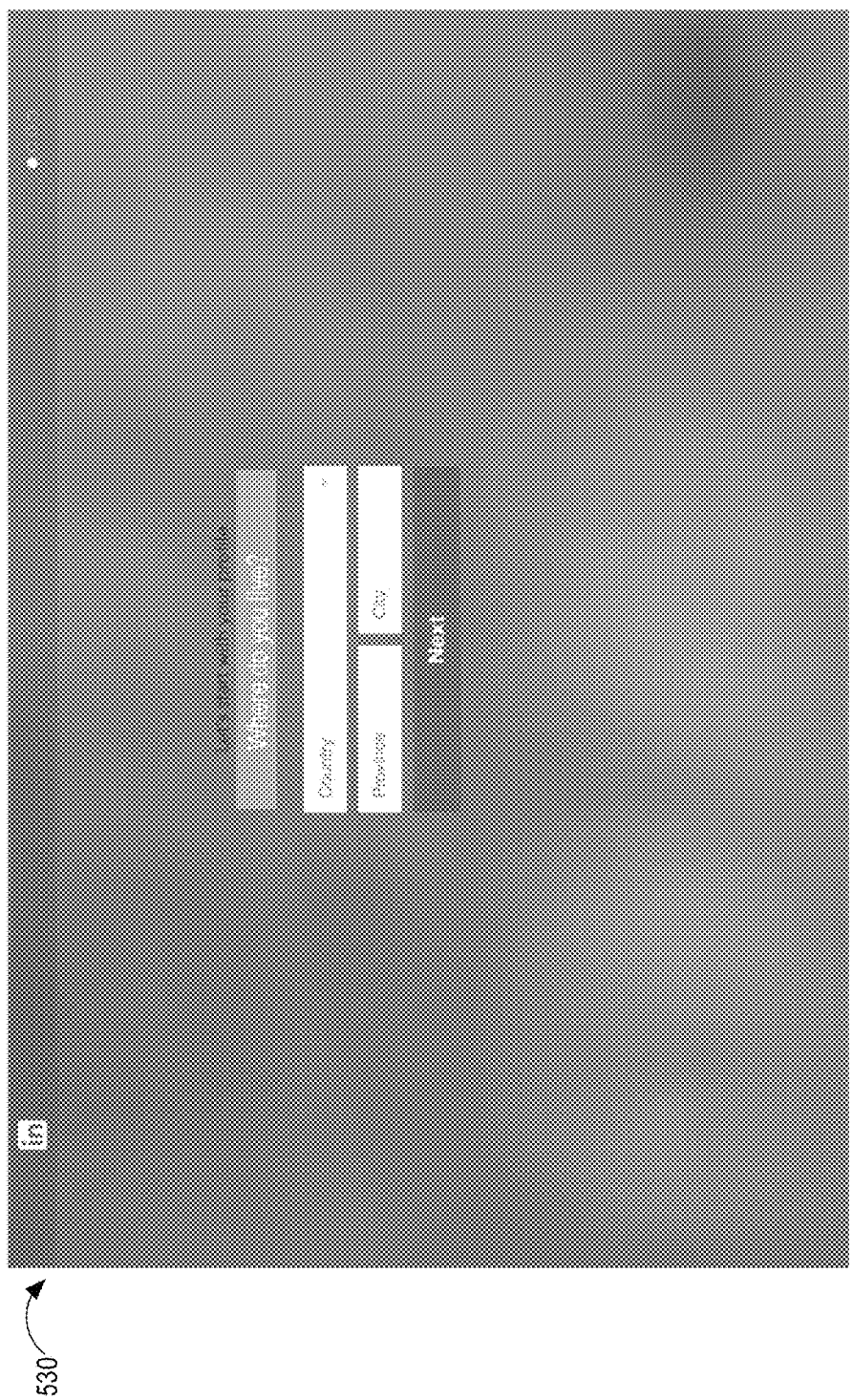

User interface 520 includes four data fields that are required for the user to register with service provider 130. The four data fields are first name, last name, email address, and password that will be used, in conjunction with the email address, to grant the user access in the future to the user's account that will be created as a part of this registration process. After the user has entered the required information and selects the "Join now" button 522, user interface 530 depicted in FIG. 5C is displayed to the user.

User interface 530 prompts the user to enter information that identifies the residence of the user. In this example, the user is prompted to enter the user's country of residence, province of residence, and city of residence. In another embodiment, user interface 530 prompts the user to enter only a zip code, which may be used to uniquely identify a city and state in the United States.

Figure 5D:
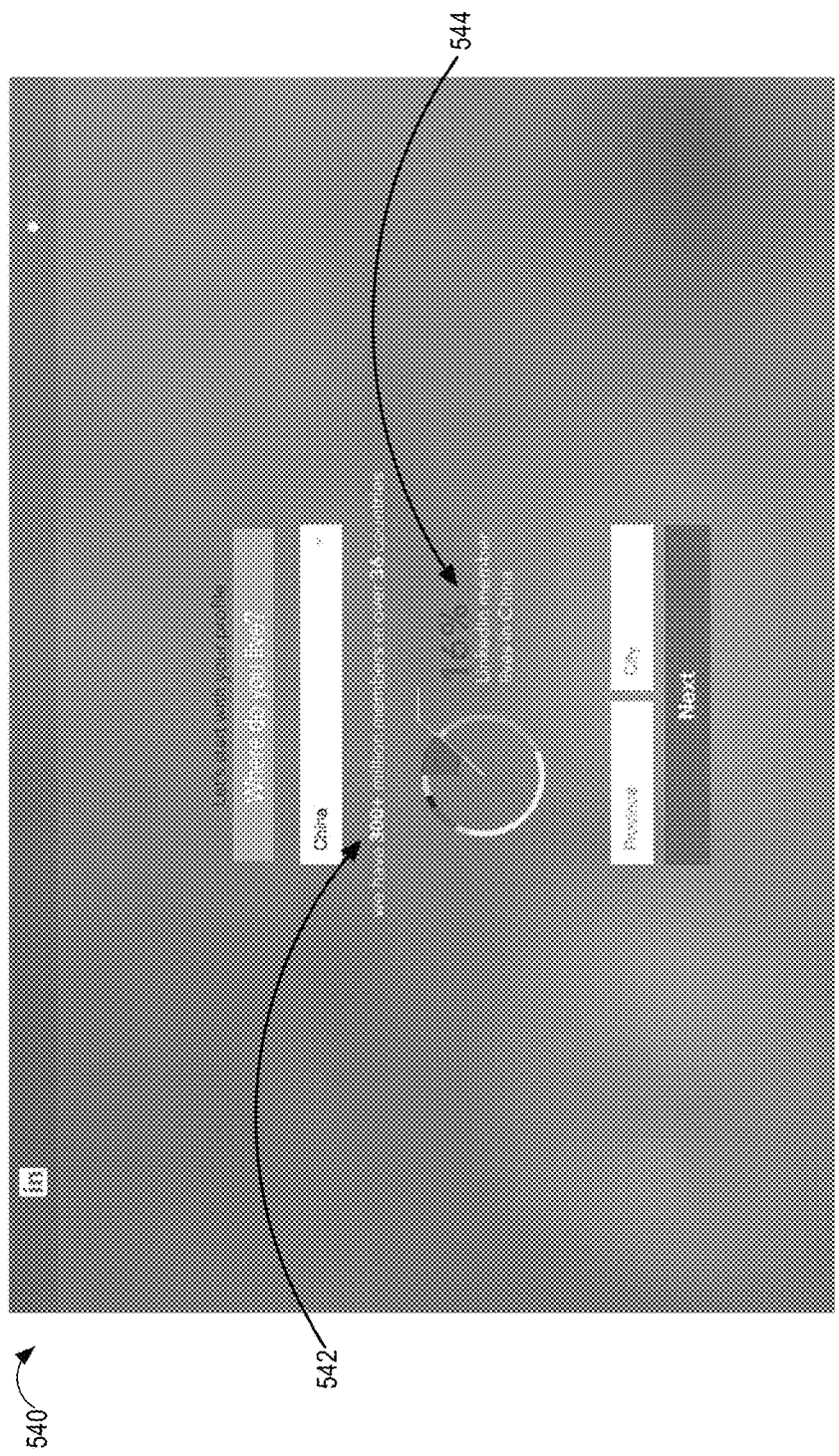

Returning to user interface 530, in response to the user entering "China" as the user's country of residence, IDG 132 causes user interface 530 to be updated to become user interface 540, depicted in FIG. 5D.

User interface 540 includes (a) member data 542 that indicates a number of members of service provider 130 who also live in China and (b) percentage data 544 that indicates a percentage of all members of service provider 130 who live in China. Member data 542 and percentage data 544 are displayed below the country input field and above the province and city input fields.

Figure 5E:
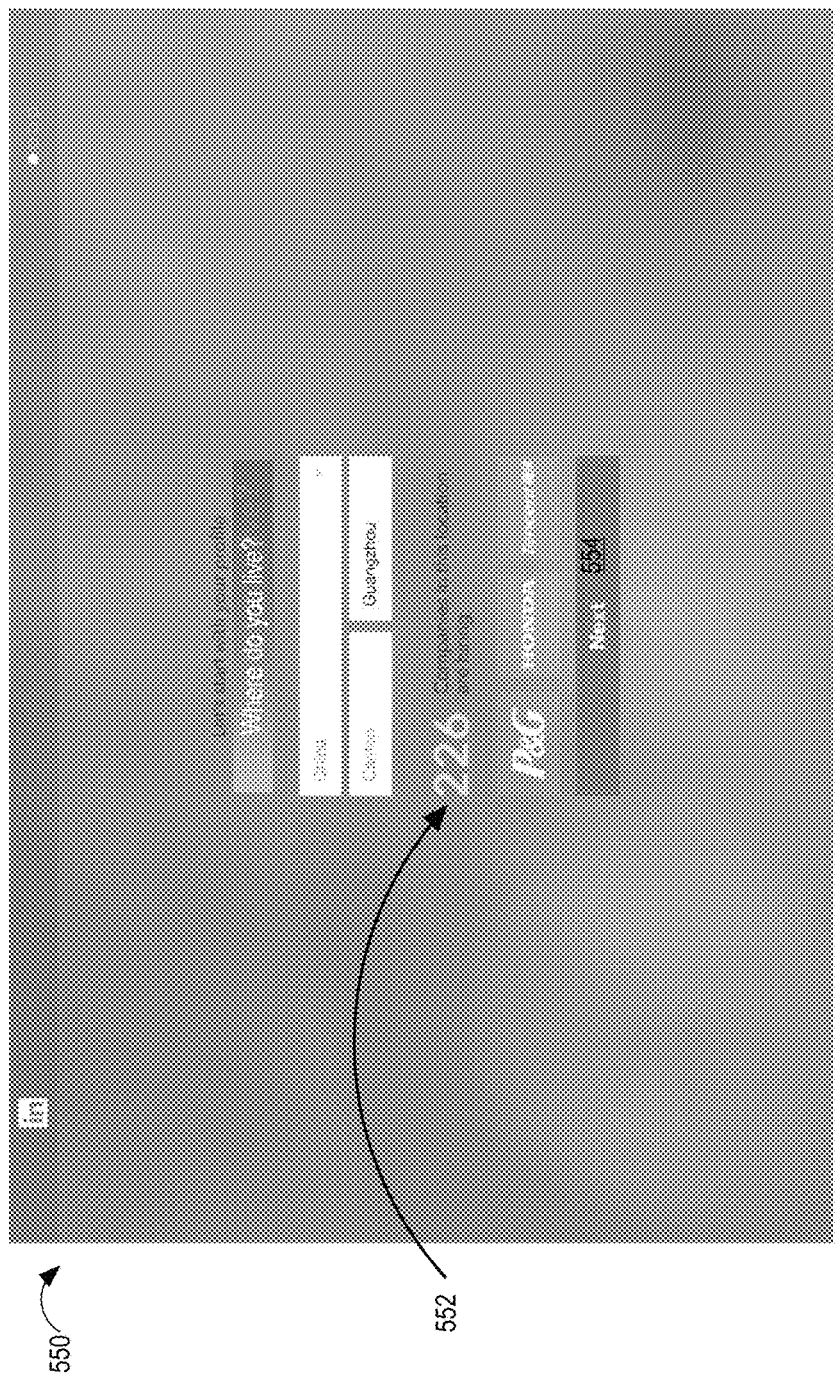
Figure 5F:
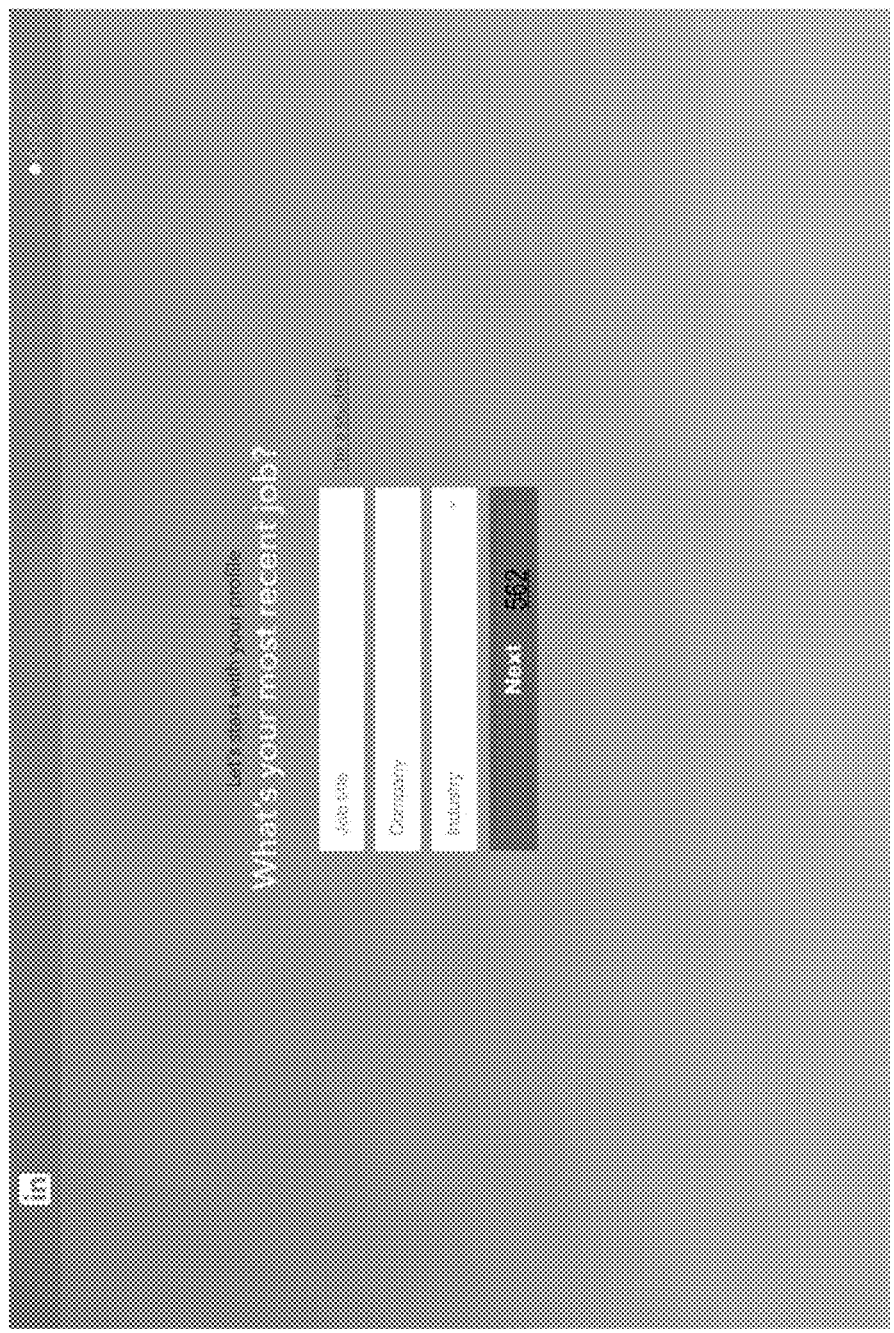

FIG. 5E depicts user interface 550 after the user has provided input that indicates a province and city of the user's residence. Member data 542 and percentage data 544 may disappear after the user begins entering the input or after the user has completed entering the input. User interface 550 includes company data 552 that indicates a number of companies in the city of Guangzhou that are hiring. The companies may be registered with service provider 130 and provide job postings for display through service provider 130. Thus, service provider 130 may determine company data 552 by analyzing (e.g., periodically) a job posting database, which may be separate from user account database 134. Alternatively, service provider 130 may determine company data 552 by analyzing (or requesting such) data from one or more third party sources.

Member data 552 is displayed below the province and city input fields and above the "Next" button 554. In response to user input selecting "Next" button 554, service provider 130 causes user interface 560 (depicted in FIG. 5F) to be generated and sent to client device 110 for display.

User interface 560 includes three more input fields for submitting personal information: job title, company name, and industry. User interface 560 also includes a "Next" button 562.

Figure 5G:
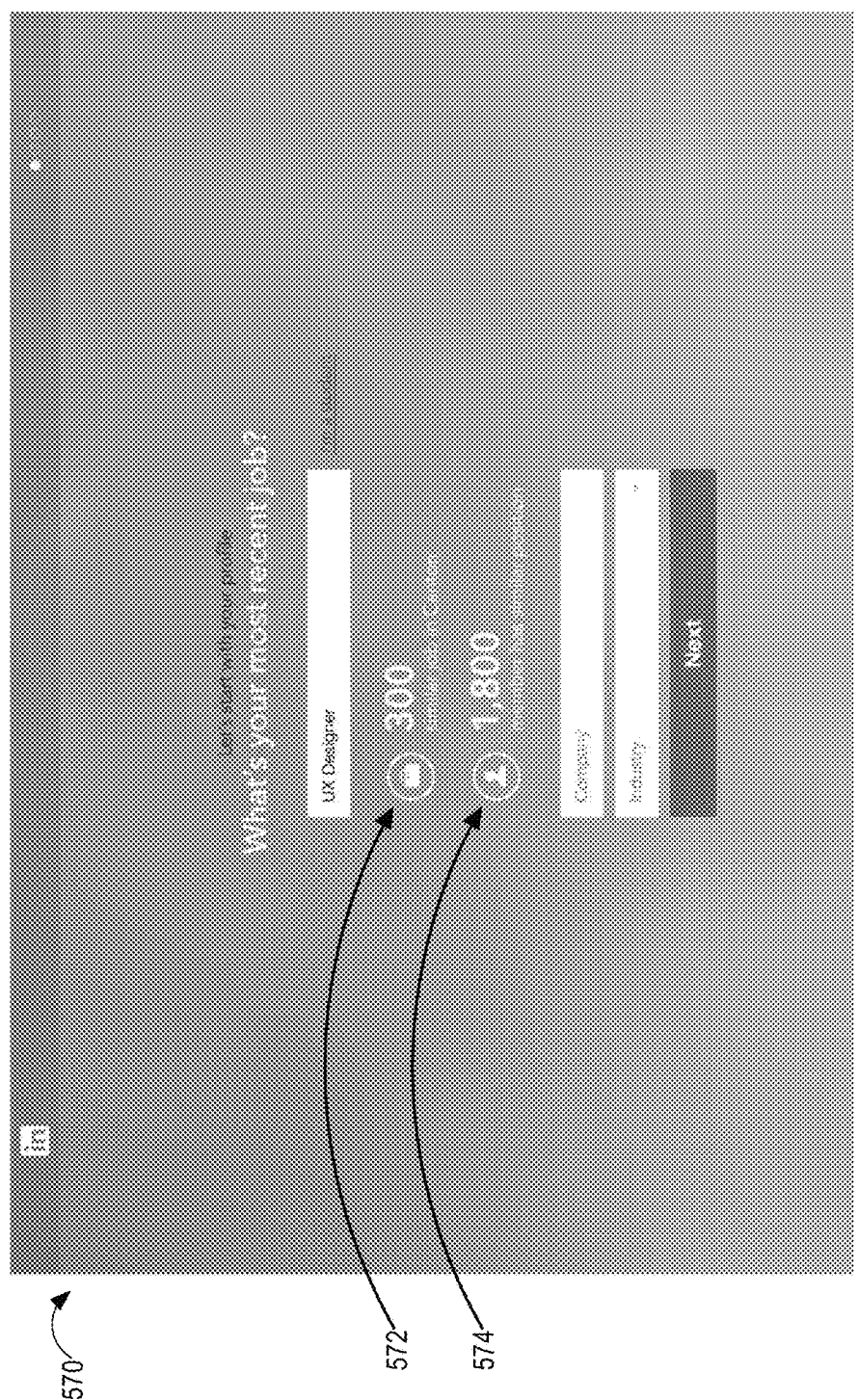

FIG. 5G depicts user interface 570 that is displayed in response to the user entering "UX Designer" as job title of the user's most recent job, which may be the user's current job. User interface 570 includes job data 572 that indicates a number of similar jobs that are currently available in the province of Canton, which name was provided by the user previously. User interface 570 also includes member data 574 that indicates a number of members of service provider 130 who have a similar job title. Job data 572 and member date 574 are displayed below the job title input field and the above the company name input field.

Figure 5H:
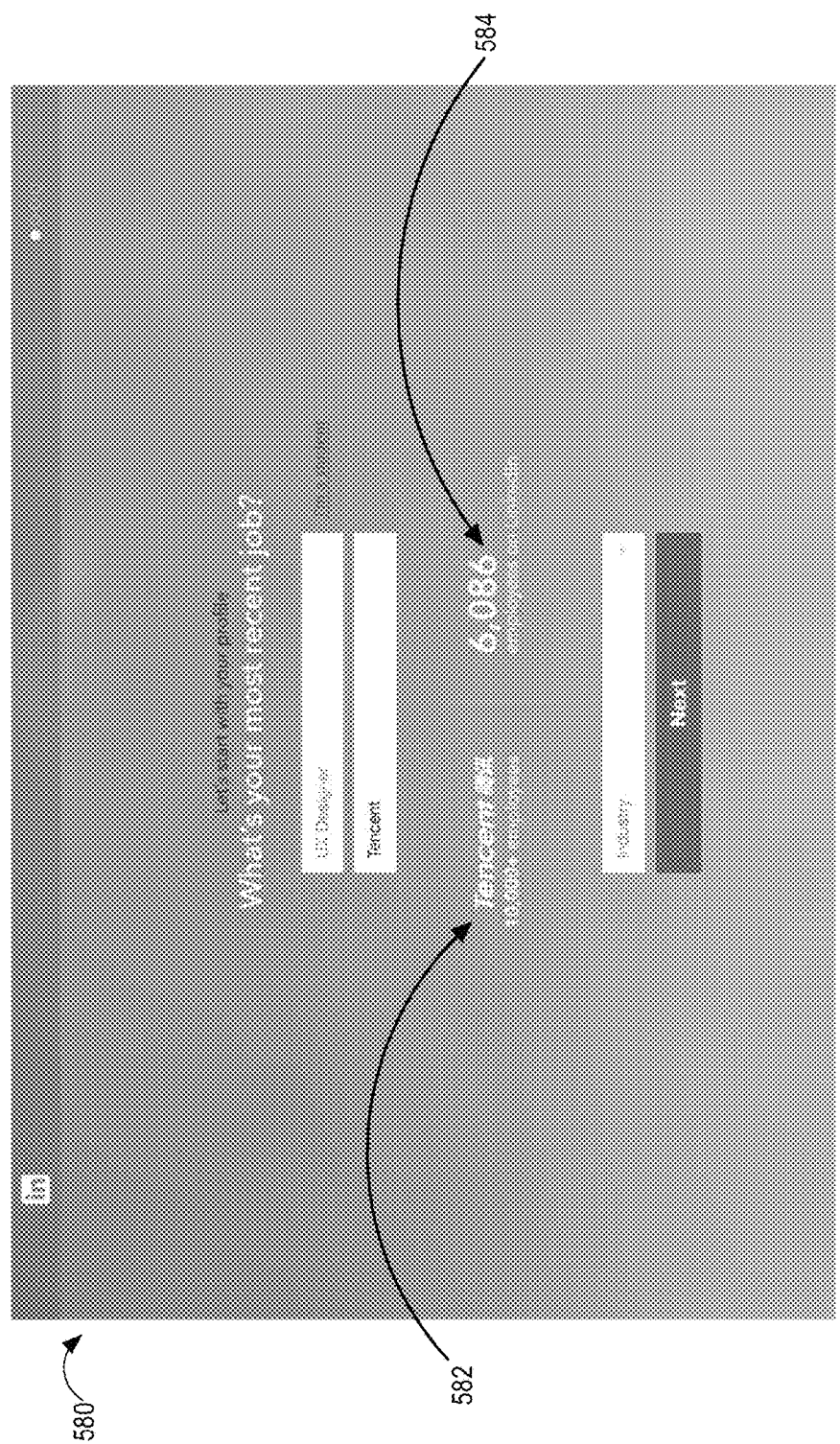

FIG. 5H depicts user interface 580 that is displayed in response to the user entering "Tencent" as the name of the user's current employer. The company name input field may appear to move upward after the user has formally submitted the company's name in order to make room for total employee data 582 and employee member data 584. Total employee data 582 indicates a current number of Tencent employees while employee member data 584 indicates a number of Tencent employees who are also registered members of service provider 130.

In an embodiment, if employee member data 584 is large relative to total employee data 582 (e.g., 50% or greater), then service provider 130 may determine to display both interactive data items since the comparison may highlight how influential service provider 130 is, especially with the named company. Otherwise, service provider 130 may provide only one of the two interactive data items. Thus, in some cases, service provider 130 has the option of providing one or multiple interactive data items concurrently in response to receiving (or otherwise determining) a personal data item and the decision whether to provide one or multiple interactive data items is based on a comparison between the two data items.

Figure 5I:
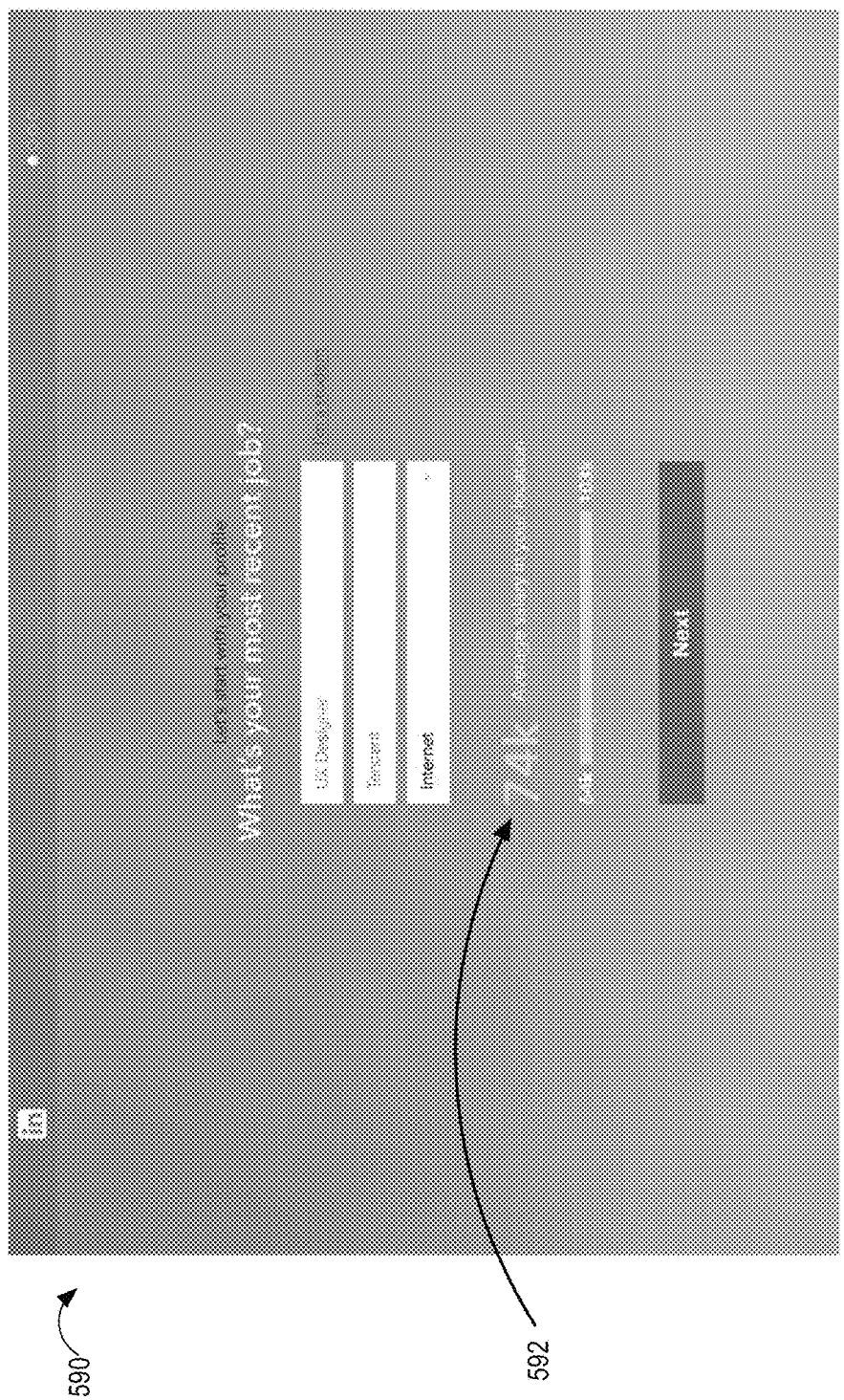

FIG. 5I depicts user interface 590 that is displayed in response to the user entering "Internet" as an industry in which the user works (or has worked). User interface 590 indicates salary data 592 that indicates a salary range and, specifically an average salary in the user's geographic location. Additionally, the average salary may be based on the indicated industry (i.e., Internet in this example). Alternatively, salary data 592 may indicate a median salary and/or other quantiles, such as 25% and 75% percentiles.

In the above example screenshots, service profile 130 is a professional networking service. The types of personal information include geographical location, job title, industry, and past or current employer. Other types of personal information that may trigger the display of interactive data include educational institutions that a user attended or from which the user graduated, personal interests (e.g., specific sports, types of music, traveling clubs), and civic organizations of which the user is a member.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
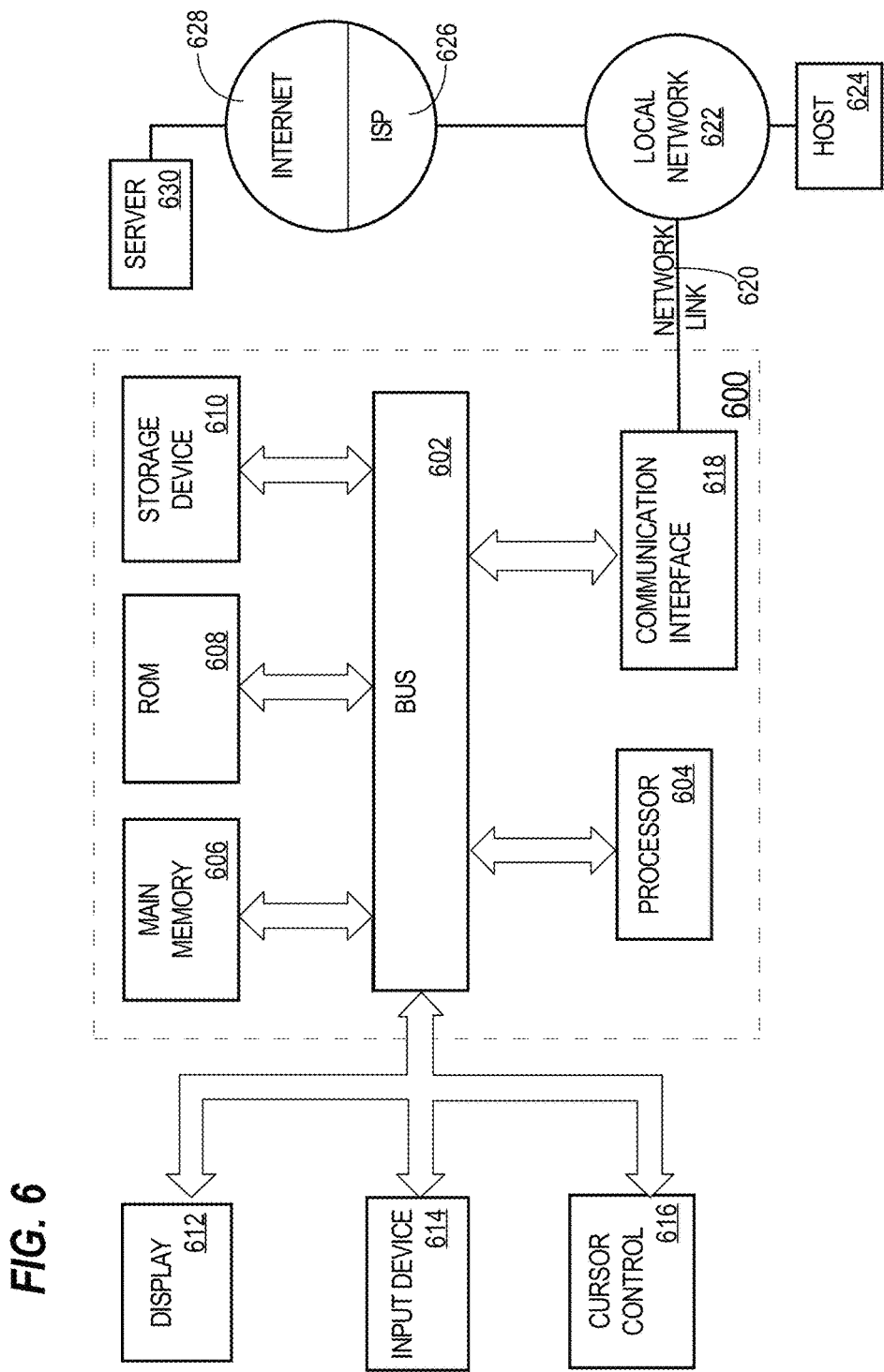
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    based on online interactions between a social network provider and a plurality of users other than a particular user, storing social network data;
    receiving, at the social network provider, input from a client device;
    in response to receiving the input, initiating a registration process by sending, from the social network provider, to the client device, registration information that requests user information about the particular user;
    after sending the registration information to the client device, receiving, from the client device, at the social network provider, first user information about the particular user;

determining, based on the first user information, first interactive data that is based on the first user information, that comprises employment or registration-related information regarding a subset of the plurality of users, and that is an aggregation of a portion of the social network data;

prior to completion of the registration process, after determining the first interactive data, and while the first user information is displayed by the client device, sending the first interactive data from the social network provider to the client device for display by the client device, wherein the first interactive data is displayed concurrently with the first user information;

wherein the method is performed by one or more computing devices.

2. The method of claim 1, further comprising, after sending the first interactive data:
receiving, from the client device, at the social network provider, second user information about the particular user;
determining, based on the first user information and the second user information, second interactive data that is related to the first user information and the second user information;
sending the second interactive data from the social network provider to the client device for display by the client device.

3. The method of claim 2, further comprising:
performing a first aggregation of the social network data to generate first aggregated data, wherein the first interactive data includes the first aggregated data;
performing a second aggregation of the social network data to generate second aggregated data that is a different type of data than the first aggregated data, wherein the second interactive data includes the second aggregated data.

4. The method of claim 1, wherein the registration information requests information about two or more of a name of the particular user, a geographical location of the particular user, or an email address of the particular user.

5. The method of claim 4, wherein:
the registration information requests information about two or more of a job status of the particular user, a degree earned by the particular user, a school attended by the particular user, a job title of a job held by the particular user, or a current employer of the particular user.

6. The method of claim 1, further comprising:
storing an association between a plurality of personal information types and a plurality of interactive data types;
wherein determining the first interactive data comprises:
determining a particular type of the first user information;
identifying a personal information type, in the plurality of personal information types, that matches the particular type;
based on the association, identifying an interactive data type, of the plurality of interactive data types, that corresponds to the personal information type;
determining the first interactive data based on the interactive data type.

7. The method of claim 6, wherein:
identifying the interactive data type comprises identifying a first interactive data type and a second interactive data type;
the first interactive data comprises a first interactive data item and a second interactive data item;
the first interactive data item is of the first interactive data type and the second interactive data item is of the second interactive data type.

8. The method of claim 1, wherein:
the first user information is a geographical location in which the particular user resides;
the first interactive data is based on one of:
a number of job postings for jobs in the geographical location,
a number of members, of a social network service, that reside in the geographical location, or
a number of companies, in the geographical location, that use the social network service.

9. The method of claim 1, wherein:
the social network provider provides a professional networking service;
the first user information is a job title;
the first interactive data is based on one of:
a number of job openings with the job title,
a number of companies that have job openings for the job title,
names of companies that have job openings for the job title,
a number of members of the social network provider who have the same or similar job title, or
a number of cities that are hiring for the job title.

10. The method of claim 1, wherein:
the social network provider provides a professional networking service;
the first user information is a name of a company;
the first interactive data is based on one of:
a number of people who work for the company,
a number of people who work for the company and who are members of the social network provider, or
one or more seniority levels in the company.

11. The method of claim 1, wherein:
the social network provider provides a professional networking service;
the first user information is a name of a particular industry;
the first interactive data is based on one of:
salaries of people who work in the particular industry, or
salaries of people who work in the particular industry and who are members of the social network provider.

12. The method of claim 1, wherein:
the social network provider provides a professional networking service;
the first user information is a name of a particular educational institution;
the first interactive data is based on one of:
a number of people who are alumni of the particular educational institution, or
a number of people who are alumni of the particular educational institution and who are members of the social network provider.

13. The method of claim 1, wherein:
the particular user has not yet registered with the social network provider when the first interactive data is sent to the client device;
determining the first interactive data comprises determining the first interactive data in response to receiving the first user information.

14. The method of claim 1, further comprising:
after receiving the first user information and prior to determining the first interactive data, registering the particular user with the social network provider;
wherein the particular user has registered with the social network provider when the first interactive data is sent to the client device;
wherein the first user information is a change to a profile, of the particular user, that is maintained by the social network provider.

15. A system comprising:
one or more processors;
one or more storage media storing instructions which, when executed by the one or more processors, cause:
receiving, at a social network provider, input from a client device;
in response to receiving the input, initiating a registration process by sending, from the social network provider, to the client device, a registration web page that requests user information about a user and that includes a user interface comprising a plurality of input fields;
after sending the registration web page to the client device, receiving, from the client device, through a first input field of the plurality of input fields of the user interface, at the social network provider, first user information about the user;
determining, based on the first user information, first interactive data that is related to the first user information;
while the first user information is displayed in the user interface, causing the user interface to be updated to include the first interactive data by sending the first interactive data from the social network provider to the client device for display by the client device through the user interface;
after sending the first interactive data to the client device, receiving, from the client device, through a second input field of the plurality of input fields of the user interface, at the social network provider, second user information about the user;
determining, based on the second user information, second interactive data that is related to the second user information;
prior to completion of the registration process and while the second user information is displayed in the user interface, causing the user interface to be updated to include the second interactive data by sending the second interactive data from the social network provider to the client device.

16. The system of claim 15, wherein the registration web page requests information about two or more of a name of the user, a geographical location of the user, or an email address of the user.

17. The system of claim 16, wherein:
the registration web page requests information about two or more of a job status of the user, a degree earned by the user, a school attended by the user, a job title of a job held by the user, or a current employer of the user.

18. The system of claim 15, wherein the instructions, when executed by the one or more processors, further cause:
storing an association between a plurality of personal information types and a plurality of interactive data types;
wherein determining the first interactive data comprises:
determining a particular type of the first user information;
identifying a personal information type, in the plurality of personal information types, that matches the particular type;
based on the association, identifying an interactive data type, of the plurality of interactive data types, that corresponds to the personal information type;
determining the first interactive data based on the interactive data type.

19. The system of claim 18, wherein:
identifying the interactive data type comprises identifying a first interactive data type and a second interactive data type;
the first interactive data comprises a first interactive data item and a second interactive data item;
the first interactive data item is of the first interactive data type and the second interactive data item is of the second interactive data type.

20. The system of claim 15, wherein:
the first user information is a geographical location in which the user resides;
the first interactive data is based on one of:
a number of job postings for jobs in the geographical location,
a number of members, of a social network service, that reside in the geographical location, or
a number of companies, in the geographical location, that use the social network service.

21. The system of claim 15, wherein:
the social network provider provides a professional networking service;
the first user information is a job title;
the first interactive data is based on one of:
a number of job openings with the job title,
a number of companies that have job openings for the job title,
names of companies that have job openings for the job title,
a number of members of the social network provider who have the same or similar job title, or
a number of cities that are hiring for the job title.

22. The system of claim 15, wherein:
the social network provider provides a professional networking service;
the first user information is a name of a company;
the first interactive data is based on one of:
a number of people who work for the company,
a number of people who work for the company and who are members of the social network provider, or
one or more seniority levels in the company.

23. The system of claim 15, wherein:
the social network provider provides a professional networking service;
the first user information is a name of a particular industry;
the first interactive data is based on one of:
salaries of people who work in the particular industry, or
salaries of people who work in the particular industry and who are members of the social network provider.

24. The system of claim 15, wherein:
the social network provider provides a professional networking service;
the first user information is a name of a particular educational institution;
the first interactive data is based on one of:
a number of people who are alumni of the particular educational institution, or a number of people who are alumni of the particular educational institution and who are members of the social network provider.

25. The system of claim 15, wherein:
the user has not yet registered with the social network provider when the first interactive data is sent to the client device;
determining the first interactive data comprises determining the first interactive data in response to receiving the first user information.

26. The system of claim 15, wherein the instructions, when executed by the one or more processors, further cause:
after receiving the first user information and prior to determining the first interactive data, registering the user with the social network provider;
wherein the user has registered with the social network provider when the first interactive data is sent to the client device;
wherein the first user information is a change to a profile, of the user, that is maintained by the social network provider.

27. The system of claim 15, wherein:
the instructions, when executed by the one or more processors, further cause storing, by the social network provider, a plurality of entity profiles;
the first interactive data is based on data from the plurality of entity profiles.

\* \* \* \* \*